(12) United States Patent
Frieman

(10) Patent No.: US 6,755,658 B2
(45) Date of Patent: Jun. 29, 2004

(54) GAME APPARATUSES AND METHODS FOR USE IN TEACHING THE ADDITION, SUBTRACTION, MULTIPLICATION, AND DIVISION OF POSITIVE AND NEGATIVE NUMBERS

(76) Inventor: Shlomo Ruvane Frieman, 139 S. Mansfield Ave., Los Angeles, CA (US) 90036

( * ) Notice: Subject to any disclaimer, the term of this patent is extended or adjusted under 35 U.S.C. 154(b) by 0 days.

(21) Appl. No.: 10/285,838

(22) Filed: Nov. 1, 2002

(65) Prior Publication Data

US 2004/0067474 A1 Apr. 8, 2004

Related U.S. Application Data

(63) Continuation-in-part of application No. 10/264,875, filed on Oct. 4, 2002.

(51) Int. Cl.[7] .............................................. G09B 23/02
(52) U.S. Cl. ........................ 434/191; 434/188; 434/208; 434/209
(58) Field of Search ................................. 434/188, 191, 434/193, 200, 201, 203, 205, 208, 209

(56) References Cited

U.S. PATENT DOCUMENTS

| | | | |
|---|---|---|---|
| 651,892 A | * | 6/1900 | Schneider .................... 434/208 |
| 1,294,126 A | | 2/1919 | Linay |
| 3,094,792 A | | 6/1963 | Morgan et al. |
| 3,229,388 A | | 1/1966 | Smith |
| 3,410,002 A | | 11/1968 | Mulholloil et al. |
| 3,414,986 A | | 12/1968 | Staggen |
| 3,452,454 A | | 7/1969 | Easton et al. |
| 3,938,669 A | | 2/1976 | Vinton |
| 4,177,581 A | | 12/1979 | Walker |
| 4,354,842 A | * | 10/1982 | Stoddard et al. ............. 434/195 |
| 4,713,009 A | * | 12/1987 | Borenson ..................... 434/188 |
| 5,039,603 A | * | 8/1991 | Pocius ......................... 434/188 |
| 5,167,505 A | * | 12/1992 | Walsh ......................... 434/205 |
| 5,334,026 A | * | 8/1994 | Ylitalo ....................... 434/203 |
| 5,474,455 A | | 12/1995 | Yang |
| 5,529,497 A | * | 6/1996 | Bigold ........................ 434/191 |
| 6,089,871 A | | 7/2000 | Jaffe |
| 6,413,094 B1 | | 7/2002 | Tallal et al. |
| 6,513,708 B2 | * | 2/2003 | Evans ........................... 235/64 |

* cited by examiner

Primary Examiner—Kurt Fernstrom

(57) ABSTRACT

Game apparatuses and methods for assisting in teaching the addition, subtraction, multiplication, and division of positive and, especially, negative numbers, are based on the Null Theory of Adding, Subtracting, Multiplying, and Dividing Positive and Negative Numbers. An exemplary game apparatus comprises (a) a plurality of positive units, (b) a plurality of negative units, (c) a demarcated playing zone, and (d) a means for measuring the number of free positive units and free negative units within the demarcated playing zone. Within the demarcated playing zone, free positive units combine with free negative units zone to form null units, with each null unit comprising an equal number of positive and negative units. Each null unit preferably comprises one positive unit and one negative unit.

19 Claims, 24 Drawing Sheets

GAME APPARATUSES AND METHODS FOR USE IN TEACHING THE ADDITION, SUBTRACTION, MULTIPLICATION, AND DIVISION OF POSITIVE AND NEGATIVE NUMBERS

CROSS REFERENCE TO RELATED APPLICATION

This application is a continuation-in-part of U.S. patent application Ser. No. 10/264,875, filed Oct. 4, 2002, entitled Game Apparatuses and Methods for Use in Teaching the Addition and Subtraction of Positive and Negative Numbers, which application is incorporated herein in its entirety by reference.

FIELD OF THE INVENTION

The present invention relates to educational game apparatuses and methods for use in teaching the addition, subtraction, multiplication, and division of positive and, especially, negative numbers. The game apparatuses and methods of the present invention enable students to see and understand a theory for adding, subtracting, multiplying, and dividing positive and negative numbers.

DESCRIPTION OF THE PRIOR ART

A description of the prior art is set forth in U.S. Pat. Nos. 1,294,126, 3,094,792, 3,229,388, 3,410,002, 3,414,986, 3,452,454, 3,935,649, 4,177,681, 5,474,455, 6,089,871, and U.S. Pat. No. 6,413,099, which patents are incorporated herein in their entireties by reference.

As evidenced by the above-cited patents, educational game apparatuses and methods exist for teaching mathematical concepts. However, teaching the addition, subtraction, multiplication, and division of positive and, especially, negative numbers usually entails students learning by rote the rules of adding, subtracting, multiplying, and dividing positive and negative numbers without ever understanding the rhyme or reason behind what they are doing. Other students, unfortunately, never learn the rules and, for them, mathematics becomes a dreaded black hole.

SUMMARY OF THE INVENTION

Accordingly, a technique is needed for teaching the addition, subtraction, multiplication, and division of positive and, especially, negative numbers that clearly explains a cogent theory behind the rules.

The apparatuses and methods of the present invention for teaching the addition, subtraction, multiplication, and division of positive and negative numbers solve the above need. More specifically, the present invention is based on the Null Theory of Adding, Subtracting, Multiplying, and Dividing Positive and Negative Numbers (hereinafter referred to as the "Null Theory"). According to the Null Theory, the natural state of a given environment is the null state. In the null state, the environment is in perfect balance and appears to be devoid of any matter. However, the environment is, in fact, composed of a plurality of null units, with each null unit being, in turn, composed of a positive unit and a negative unit. The environment can be disturbed by introducing (i.e., adding) into it one or more positive units or one or more negative units. The environment can also be disturbed by removing (i.e., subtracting) from it one or more positive units or one or more negative units. In the latter case, if there are not enough free positive units available to be removed from the environment, a sufficient number of null units are split to obtain the desired number of positive units to be removed from the environment. When a null unit is split and the positive unit thereof is removed from the environment, a negative unit is left behind in the environment. (Hence, the foregoing explanation of the Null Theory clarifies and visually demonstrates the reason behind the rule that the subtraction of a positive number +X is equal to the addition of a negative number (i.e., $-(+X)=+(-X)$).) Likewise, if there are not enough free negative units available to be removed from the environment, a sufficient number of null units are split to obtain the desired number of negative units to be removed from the environment. When a null unit is split and the negative unit thereof is removed from the environment, a positive unit is left behind in the environment. (Accordingly, the foregoing explanation of the Null Theory clarifies and visually demonstrates the reason behind the rule that the subtraction of a negative number $-X$ is equal to the addition of a positive number (i.e., $-(-X)=+(+X)$).)

Another aspect of the Null Theory is that only excess positive units or excess negative units remain in the free state within the environment. For example, if there are 5 free positive units in the environment and if 3 negative units are introduced into the environment (as is the case in the mathematical expression $5+(-3)$), the 3 negative units will combine with 3 of the free positive units to form 3 null units, leaving only 2 free positive units in the environment.

With the Null Theory in mind, in one embodiment of the present invention, the game apparatus employed to teach the addition, subtraction, multiplication, and division of positive and negative numbers comprises (a) a plurality of positive units, (b) a plurality of negative units, and (c) a demarcated playing environment or zone. The positive units and the negative units are adapted to reversibly attach to or be associated with one another to form null units, with each null unit comprising at least one positive unit and at least one negative unit and the number of positive units and the number of negative units per null unit being equal. (As used in the specification and claims, the terms "attached to" and "associated with" both mean that the objects in question either can be physically reversibly held together or can be positioned in a manner such that the objects appear to have an affinity for or relationship with one another.) Preferably, each null unit comprises just one positive unit and just one negative unit.

The demarcated playing zone is typically an integral part of a playing surface.

Generally, the game apparatus further comprising a first means for measuring the number of units selected from the group consisting positive units, negative units, and combinations thereof, with the first measuring means desirably being located on the playing surface and, preferably, within the demarcated playing zone. The purpose of the first measuring means is to measure the degree that the demarcated playing zone has been disturbed from the null state. The first measuring means, which can be a scale for weighting the positive and/or negative units, is ideally an axis marked in substantially equal units from 0 to M and in substantially equal units from 0 to N, where M is a positive whole integer, N is a negative whole integer, and substantially each of the positive units is adapted to reversibly attach to or be associated with a unit from 0 to M on the axis on the playing surface, and substantially each of the negative units is adapted to reversibly attach to or be associated with a unit from 0 to N on the axis on the playing surface. While M can be virtually any positive integer, M is typically a whole positive integer from 5 to 50, more typically from 10 to 25, and most typically from 10 to 20. Similarly, while N can be virtually any negative integer, N is commonly a whole negative number from −5 to −50, more commonly from −10 to −25, and most commonly from −10 to −20. Usually, M equals the absolute value of N.

In another preferred embodiment of the invention, the apparatus further comprises a second means for measuring the number of units selected from the group consisting positive units, negative units, and combinations thereof, with the second measuring means desirably being located on the playing surface and, preferably, outside the demarcated playing zone. The purpose of the second measuring means is to act as a check point or zone to ensure that (a) the correct number of positive units and/or negative units are being transported into the demarcated playing zone and (b) the correct number of positive units and/or negative units have been removed from the demarcated playing zone. The second measuring means, which can also be a scale for weighting the positive units and/or the negative units, is ideally an axis marked in substantially equal units from 0 to P, where P is a positive whole integer and substantially each of the positive and negative units is adapted to reversibly attach to or be associated with a unit from 0 to P on the axis on the playing surface. While P can be virtually any positive integer, P is typically a whole positive integer from 10 to 100, more typically from 20 to 50, and most typically from 20 to 40. Usually, P equals M plus the absolute value of N.

It is also preferred that the game apparatus further comprise a plurality of means for reversibly holding a plurality of the null units located within the demarcated playing zone.

The game apparatus preferably also comprises an additional means for reversibly holding at least one positive unit and an additional means for reversibly holding at least one negative unit. More preferably, the game apparatus further comprises an additional means for reversibly holding a plurality of positive units and an additional means for reversibly holding a plurality of negative units. In one embodiment of the invention, the additional holding means comprises a groove divided into two sections, with one section adopted to hold a plurality of the positive units and the other section adopted to hold a plurality of the negative units. Most preferably, the additional positive unit holding means and the additional negative unit holding means are an integral part of the playing surface and are located outside the demarcated playing zone.

The playing surface of the game apparatus can be a screen of an electrical unit (such as a computer screen, a television screen, etc), a surface of a game board, a surface of a blackboard or other writing surface, a Velcro® surface, a static electricity charged surface, a magnetized surface, a magnetizable surface, or the surface of any other apparatus or device capable of displaying the demarcated playing zone, the null units, the positive units, the negative units, and the means for showing the number of free positive units and/or free negative units within the demarcated playing zone.

The game apparatus of the present invention is employed in conjunction with methods that utilize the principles of the Null Theory. In particular, in the case of adding and subtracting positive and negative numbers, the method of the present invention comprises the following steps:

Step A:
Play begins in a null state where a demarcated playing zone comprises a plurality of null units, with each null unit comprising at least one positive unit reversibly attached to at least one negative unit, the number of positive and negative units per null unit being equal.

Step B:
Take the first mathematical operation in a mathematical problem $X_1 S_m X_m S_n X_n \ldots S_z X_z$ where the mathematical expressions $X_1$, $X_m$, $X_n$, and X are independently selected from the group consisting of positive numbers, negative numbers, and combinations thereof, the mathematical operators $S_m$, $S_n$, and $S_z$ are independently selected from the group consisting of the addition operation and the subtraction operation, m is selected from the group consisting of 0 and 2, n is selected from the group consisting of 0 and 3, provided that if m is 0, n is 0, and z is selected from the group consisting of 0 and whole integers greater that 3, provided that if m is 0, z is 0, and perform the first mathematical operation $X_1$ as follows:

1. If $X_1$ is a positive number, then the mathematical operation of step (B) comprises moving or adding $X_1$ free positive units to the demarcated playing zone.

2. If $X_1$ is a negative number, then the mathematical operation of step (B) comprises moving or adding the absolute value of $X_1$ free negative units to the demarcated playing zone.

Alternatively, the mathematical operation indicated by the first mathematical expression $X_1$ can be performed as follows:

1. If $X_1$ is a positive number, then the mathematical operation of step (B) can be accomplished by breaking apart or separating $X_1$, null units that are within the demarcated playing zone into $X_1$ free positive units and into $X_1$, free negative units and removing or subtracting the $X_1$ free negative units from the demarcated playing zone.

2. If $X_1$ is a negative number, then the mathematical operation of step (B) can be accomplished by breaking apart or separating the absolute value of $X_1$ null units that are within the demarcated playing zone into the absolute value of $X_1$ free positive units and into the absolute value of $X_1$ free negative units and removing or subtracting the absolute value of $X_1$ free positive units from the demarcated playing zone.

Step C:
Take the second mathematical operation $S_2 X_2$ in the mathematical problem, where $S_2$ is selected from the group consisting of the addition operation and the subtraction operation and $X_2$ is selected from the group consisting of positive and negative numbers, and perform the mathematical operation indicated by $S_2 X_2$ as follows:

1. When $S_2$ is an addition operation and $X_2$ is a positive number (e.g., +(+3)), then step (C) comprises moving or adding $X_2$ free positive units to the demarcated playing zone and, if there are any free negative units within the demarcated playing zone, then step (C) further comprises combining up to $X_2$ free negative units that are already inside the demarcated playing zone with up to the $X_2$ free positive units that were moved into the demarcated playing zone.

2a. When $S_2$ is a subtraction operation and $X_2$ is a positive number (e.g., −(+3)), then step (C) comprises removing or subtracting $X_2$ free positive units from the demarcated playing zone and, if there are not $X_2$ free positive units within the demarcated play zone to remove from the demarcated zone, then step (C) further comprises breaking apart or separating enough null units that are within the demarcated playing zone to obtain up to the required $X_2$ free positive units and removing the $X_2$ free positive units from the demarcated playing zone.

2b. Alternatively, when $S_2$ is a subtraction operation and $X_2$ is a positive number (e.g., −(+3)), then step (C) can also be accomplished by moving or adding $X_2$ free negative units to the demarcated playing zone and, if there are any free positive units within the demarcated playing zone, then step (C) further comprises combining up to $X_2$ free positive units that are already inside the demarcated playing zone with up to the $X_2$ free negative units that were moved into the demarcated playing zone.

3a. When $S_2$ is an addition operation and $X_2$ is a negative number (e.g., +(−3)), then step (C) comprises moving or adding the absolute value of $X_2$ free negative units to the demarcated playing zone and, if there are any free positive units within the demarcated playing zone, then step (C) further comprises combining up to the absolute value of $X_2$ free positive units that are already within the demarcated playing zone with up to the absolute value of $X_2$ free negative units that were moved into the demarcated playing zone.

3b. Alternatively, when $S_2$ is an addition operation and $X_2$ is a negative number (e.g., +(−3)), then step (C) can also be accomplished by removing or subtracting $X_2$ free positive units from the demarcated playing zone and, if there are not $X_2$ free positive units within the demarcated play zone to remove from the demarcated zone, then step (C) further comprises breaking apart or separating enough null units that are within the demarcated playing zone to obtain up to the required $X_2$ free positive units and removing the $X_2$ free positive units from the demarcated playing zone.

4. When $S_2$ is a subtraction operation and $X_2$ is a negative number (e.g., −(−3)), then step (C) comprises removing or subtracting the absolute value of $X_2$ free negative units from the demarcated playing zone and, if there are not enough absolute value of $X_2$ free negative units within the demarcated play zone to remove from the demarcated playing zone, then step (C) further comprises breaking apart or separating enough null units that are within the demarcated playing zone to obtain up to the required absolute value of $X_2$ free negative units and removing the absolute value of $X_2$ free negative units from the demarcated playing zone.

Step D:

Repeat step (C) for each of the remaining mathematical operations $S_n X_n$ through $S_z X_z$ in the problem, where $X_n$ through $X_z$ are independently selected from the group consisting of positive numbers, negative numbers, and combinations thereof, and the mathematical operators $S_n$ through $S_z$ are independently selected from the group consisting of the addition operation and the subtraction operation.

As the above discussion of adding and subtracting positive and negative numbers demonstrates, when the operation sign and the sign of the mathematical expression are different, the same result follows whether the operation sign or the sign of the mathematical expression is treated as the mathematical operator as long as the other sign is treated as the sign of the unit. To illustrate, for the mathematical expression −(+3), the same result is obtained when the "−" sign is treated as the mathematical operator and the "+" sign is treated as designating the type of unit (i.e., 3 positive units) as when the "+" sign is treated as the mathematical operator and the "−" sign is treated as designating the type of unit (i.e., 3 negative units). This principal of interchangeability of signs, which is also applicable to multiplying and dividing positive and negative numbers, follows from the well established rule that ab=ba or, in our specific case, (+)(−)=(−)(+). Accordingly, students learning how to add, subtract, multiply, and divide positive and negative numbers do not have to memorize which sign is to be treated as the operator sign and which sign has to be treated as the unit sign. The students just have to remember that if they treat one of the signs as the operator sign, they must treat the other sign as the unit sign.

In the case of multiplying positive and negative numbers, the method of the present invention comprises the following steps:

Step A:

Play begins in a null state where a demarcated playing zone comprises a plurality of null units, with each null unit comprising at least one positive unit reversibly attached to at least one negative unit, the number of positive and negative units per null unit being equal.

Step B

In this scenario, $X_1$ is a multiplication expression $(S_x M_1)(S_y N_1)$, where $S_x$ and $S_y$ are independently selected from the group consisting of a positive sign and a negative sign, $M_1$ is the absolute value of a number, and $N_1$ is the absolute value of a number. The multiplication expression $(S_x M_1)(S_y N_1)$ is performed as follows:

1. If $S_x$ and $S_y$ are positive signs, move or add the absolute value of $(M_1)(N_1)$ positive units to the demarcated playing zone. Since the demarcated playing zone is initially in the null state, there are initially no free positive units or free negative units in the demarcated playing zone. Accordingly, after adding the absolute value of $(M_1)(N_1)$ positive units to the demarcated playing zone as required by step (B)(1), the total number of free positive units in the demarcated playing zone is the absolute value of $(M_1)(N_1)$.

2a. If $S_x$ is a positive sign and $S_y$ is a negative sign, remove or subtract the absolute value of $(M_1)(N_1)$ positive units from the demarcated playing zone. Since the demarcated playing zone is initially in the null state, the free positive units are removed from the demarcated playing zone by taking the absolute value of $(M_1)(M_1)$ null units that are within the demarcated playing zone, breaking or separating them into their constituent positive units and negative units, and removing the absolute value of $(M_1)(N_1)$ positive units from the demarcated playing zone. Thus, the absolute value of $(M_1)(N_1)$ negative units are left behind in the demarcated playing zone.

2b. Alternatively, when $S_x$ is a positive sign and $S_y$ is a negative sign, then step (B) can also be accomplished by moving or adding the absolute value of $(M_1)(N_1)$ negative units to the demarcated playing zone. Since the demarcated playing zone is initially in the null state, there are initially no free positive units or free negative units in the demarcated playing zone. Accordingly, after adding the absolute value of $(M_1)(N_1)$ negative units to the demarcated playing zone as required by step (B)(2b), the total number of free negative units in the demarcated playing zone is the absolute value of $(M_1)(M_1)$.

3a. If $S_x$ is a negative sign and $S_y$ is a positive sign, move or add the absolute value of $(M_1)(N_1)$ negative units to the demarcated playing zone. Since the demarcated playing zone is initially in the null state, there are initially no free positive units or free negative units in the demarcated playing zone. Accordingly, after adding the absolute value of $(M_1)(M_1)$ negative units to the demarcated playing zone as required by step (B)(3a), the total number of free negative units in the demarcated playing zone is the absolute value of $(M_1)(M_1)$.

3b. Alternatively, when $S_x$ is a negative sign and $S_y$ is a positive sign, then step (B) can also be accomplished by removing or subtracting the absolute value of $(M_1)(M_1)$ positive units from the demarcated playing zone. Since the demarcated playing zone is initially in the null state, the free positive units are removed from the demarcated playing zone by taking the absolute value of $(M_1)(N_1)$ null units that are within the demarcated playing zone, breaking or separating them into their constituent positive units and negative units, and removing the absolute value of $(M_1)(M_1)$ positive units from the demarcated playing zone. Thus, the absolute value of $(M_1)(N_1)$ negative units are left behind in the demarcated playing zone.

4. If $S_x$ and $S_y$ are negative signs, remove or subtract the absolute value of $(M_1)(N_1)$ negative units from the demarcated playing zone. Since the demarcated playing zone is initially in the null state, the free negative units are removed from the demarcated playing zone by taking the absolute value of $(M_1)(N_1)$ null units that are within the demarcated playing zone, breaking or separating them into their constituent positive units and negative units, and removing the absolute value of $(M_1)(N_1)$ negative units from the demarcated playing zone. Thus, the absolute value of $(M_1)(N_1)$ positive units are left behind in the demarcated playing zone.

In the case of dividing positive and negative numbers, the method of the present invention comprises the following steps:

Step A:

Play begins in a null state where a demarcated playing zone comprises a plurality of null units, with each null unit comprising at least one positive unit reversibly attached to at least one negative unit, the number of positive and negative units per null unit being equal.

Step B

In this scenario, $X_1$ is a division expression $(S_{xx}M_1)/(S_{yy}N_1)$, where $S_{xx}$ and $S_{yy}$ are independently selected from the group consisting of a positive sign and a negative sign, $M_1$ is the absolute value of a number, and $N_1$ is the absolute value of a number. The division expression $(S_{xx}M_1)/(S_{yy}N_1)$ is performed as follows:

1. If $S_{xx}$ and $S_{yy}$ are positive signs, move or add the absolute value of $(M_1)/(N_1)$ positive units to the demarcated playing zone. Since the demarcated playing zone is initially in the null state, there are initially no free positive units or free negative units in the demarcated playing zone. Accordingly, after adding the absolute value of $(M_1)/(N_1)$ positive units to the demarcated playing zone as required by step (B)(1), the total number of free positive units in the demarcated playing zone is the absolute value of $(M_1)/(M_1)$.

2a. If $S_{xx}$ is a positive sign and $S_{yy}$ is a negative sign, remove or subtract the absolute value of $(M_1)/(N_1)$ positive units from the demarcated playing zone. Since the demarcated playing zone is initially in the null state, the free positive units are removed from the demarcated playing zone by taking the absolute value of $(M_1)/(N_1)$ null units that are within the demarcated playing zone, breaking or separating them into their constituent positive units and negative units, and removing the absolute value of $(M_1)/(M_1)$ positive units from the demarcated playing zone. Thus, the absolute value of $(M_1)/(M_1)$ negative units are left behind in the demarcated playing zone.

2b. Alternatively, when $S_{xx}$ is a positive sign and $S_{yy}$ is a negative sign, then step (B) can also be accomplished by moving or adding the absolute value of $(M_1)/(M_1)$ negative units to the demarcated playing zone. Since the demarcated playing zone is initially in the null state, there are initially no free positive units or free negative units in the demarcated playing zone. Accordingly, after adding the absolute value of $(M_1)/(M_1)$ negative units to the demarcated playing zone as required by step (B)(2b), the total number of free negative units in the demarcated playing zone is the absolute value of $(M_1)/(M_1)$.

3a. If $S_{xx}$ is a negative sign and $S_{yy}$ is a positive sign, move or add the absolute value of $(M_1)/(N_1)$ negative units to the demarcated playing zone. Since the demarcated playing zone is initially in the null state, there are initially no free positive units or free negative units in the demarcated playing zone. Accordingly, after adding the absolute value of $(M_1)/(N_1)$ negative units to the demarcated playing zone as required by step (B)(3), the total number of free negative units in the demarcated playing zone is the absolute value of $(M_1)/(N_1)$.

3b. Alternatively, when $S_{xx}$ is a negative sign and $S_{yy}$ is a positive sign, then step (B) can also be accomplished by removing or subtracting the absolute value of $(M_1)/(N_1)$ positive units from the demarcated playing zone. Since the demarcated playing zone is initially in the null state, the free positive units are removed from the demarcated playing zone by taking the absolute value of $(M_1)/(N_1)$ null units that are within the demarcated playing zone, breaking or separating them into their constituent positive units and negative units, and removing the absolute value of $(M_1)/(N_1)$ positive units from the demarcated playing zone. Thus, the absolute value of $(M_1)/(N_1)$ negative units are left behind in the demarcated playing zone. ps 4. If $S_{xx}$ and $S_{yy}$ are negative signs, remove or subtract the absolute value of $(M_1)/(N_1)$ negative units from the demarcated playing zone. Since the demarcated playing zone is initially in the null state, the free negative units are removed from the demarcated playing zone by taking the absolute value of $(M_1)/(N_1)$ null units that are within the demarcated playing zone, breaking or separating them into their constituent positive units and negative units, and removing the absolute value of $(M_1)/(N_1)$ negative units from the demarcated playing zone. Thus, the absolute value of $(M_1)/(N_1)$ positive units are left behind in the demarcated playing zone.

When the mathematical equation includes the addition and/or subtraction of one or more multiplication and/or division expressions by themselves and/or together with the addition and/or subtraction of one or more positive and/or negative numbers, each operation can be solved in the order that it appears in the equation. Alternatively, each of the multiplication and division expressions in the mathematical equation can be solved first, thereby converting the mathematical equation into one containing only addition and/or subtraction operations, and solving the resulting mathematical equation as discussed above.

As noted with respect to the game apparatus, in the methods of the present invention, each null unit preferably comprises one positive unit reversibly attached to or associated with one negative unit.

It is also preferred that the methods further comprise the step of measuring the number of the free positive units and the number of the free negative units within the demarcated playing zone. In one preferred version of the methods of the present invention, the measurement is performed by the step of placing the free positive units that are within the demarcated playing zone along the positive portion of an axis marked with substantially equal spaces from 0 to M and the step of placing the free negative units that are within the demarcated playing zone along the negative portion of an axis marked with substantially equal spaces from 0 to N, where M and N are as defined above. While the positive portion of the axis preferably forms a continuum with the negative portion of the axis, the present invention includes the embodiment where there is a separate positive axis having substantially equal spaces from 0 to M and a separate negative axis having substantially equal spaces from 0 to N, where M and N are as previously defined.

Furthermore, it is preferred that the methods of the present invention also comprise the step of measuring the number of free positive units and the number of free negative units that are to be added to or that have been removed from the demarcated playing zone. In one desirable version of the methods of the present invention, the measurement is performed by the step of placing the free positive units or the free negative units that are to be added to or that have been taken out of the demarcated playing zone along a second axis that is located outside the demarcated playing zone. The second axis is marked with substantially equal spaces from 0 to P, where P is as previously defined.

While the foregoing apparatuses and methods can be used to teach young children who are just learning to add and subtract only positive numbers, when teaching the addition and subtraction of only positive numbers, it is sufficient to use a simpler game apparatus such as one comprising (a) at least one means for measuring unit increments, (b) a plurality of means for indicating a single unit, and (c) a means for holding the plurality of single unit indicating means in slideable relationship to the measuring means. For instance, the plurality of single unit indicating means can comprise a plurality of beads, the holding means can comprise a dowel, with the beads being slideably mounted on the dowel, and the game apparatus can comprises two measuring means (such as two rulers), with each measuring means being position so that the game apparatus can be played with equal facility by both right and left handed players.

For a fuller understanding of the nature and advantages of the mathematical game apparatuses and methods of the present invention, reference should be made to the ensuing detailed description taken in conjunction with the accompanying drawings.

BRIEF DESCRIPTION OF THE DRAWINGS

Exemplary game apparatuses of the present invention are shown in the drawings where.

It should be noted that the same numbers in the figures represent the same element of the game apparatuses of the present invention.

DETAILED DESCRIPTION OF THE INVENTION

Figure 1:
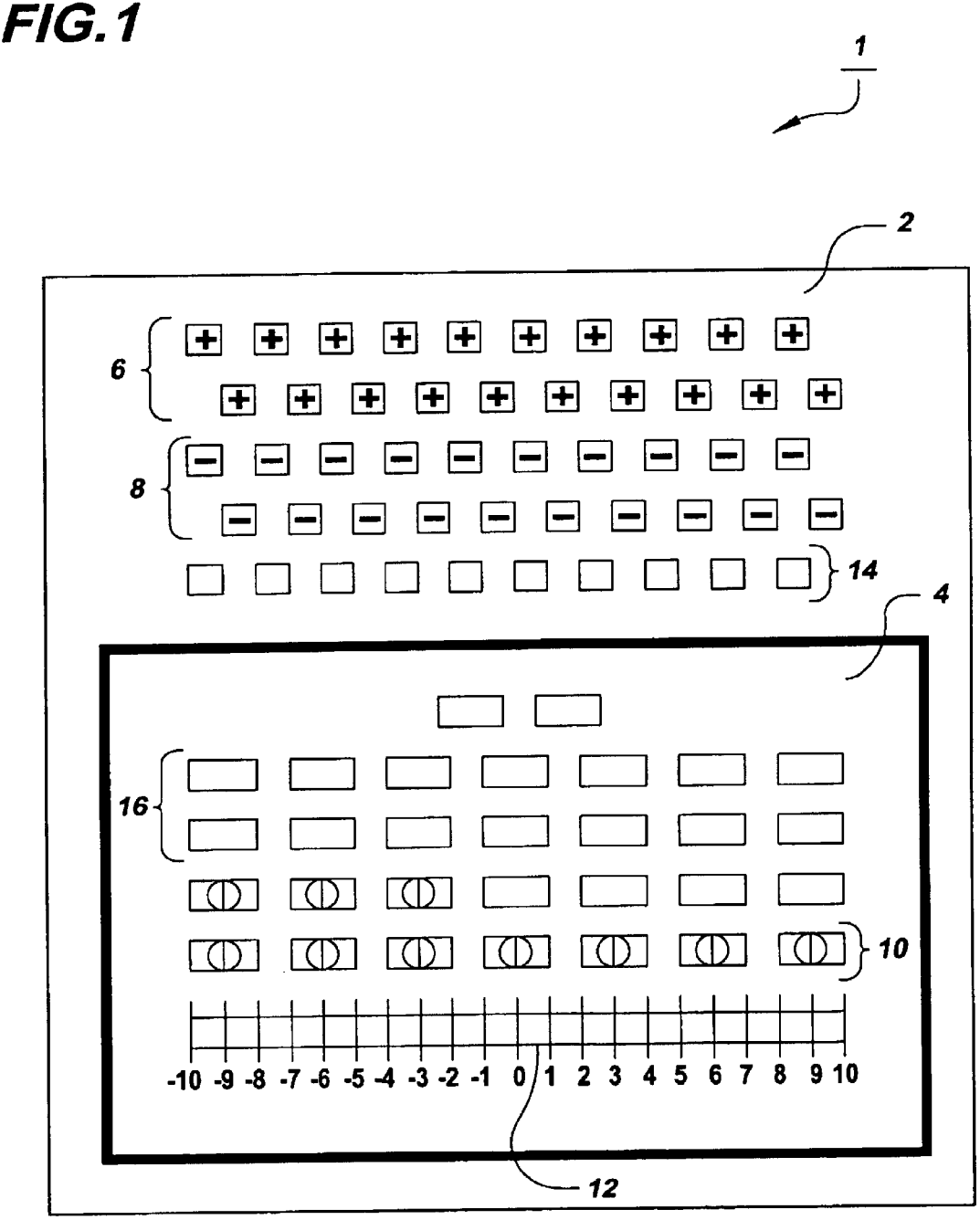
FIG. 1 is a top view of a playing surface employed in the methods of the present invention.

FIG. 1 shows an embodiment of the present invention in which the game apparatus 1 comprises a playing surface 2, a demarcated playing environment or zone 4 located within the playing surface 2, a plurality of free positive units 6 (located outside the demarcated playing zone 4) removably attached to the playing surface 2, a plurality of free negative units 8 (located outside the demarcated playing zone 4) removably attached to the playing surface 2, a plurality of null units 10 (located inside the demarcated playing zone 4) removably attached to the playing surface 2, and an axis 12 (located within the demarcated playing zone 4) numbered from −10 to 10.

The playing surface 2 can be a game board, a computer screen, a television screen, a liquid crystal display screen, or any other means for displaying the demarcated playing zone 4, the free positive units 6, the free negative units 8, the null units 10, and the axis 12.

The area of the demarcated playing zone 4 can comprise a portion of the area of the playing surface 2 as shown in FIG. 1 or can comprise the entire area of the playing surface 2 (not shown). When the area of demarcated playing zone 4 constitutes the entire area of the playing surface 2, the free positive units 6 and the free negative units 8 either can be held in essentially any container (such as a cup, a bowl, a bag, a pocket, a groove, etc.) or can be loose.

In the version of the invention shown in FIG. 1, the free positive units 6 and the free negative units 8 are removably attached to the playing surface 2 by snuggly fitting into depressions 14 in the playing surface 2. Other means for removably attaching the positive units 6 and the negative units 8 to the playing surface 2 include, but are not limited to, Velcro, snap fittings (such as used on clothing or on Lego® building blocks), screw fittings, magnetism, gravity, etc. Of course, when the playing surface 2 is a computer screen or other essentially two-dimensional means for displaying the playing surface 2, the positive units 6 and negative units 8 are merely displayed on or merely displayed as being associated with the essentially two-dimensional means for displaying the playing surface 2.

Similarly, in the version of the invention shown in FIG. 1, the null units 10 are also removably attached to the demarcated playing zone 4 by snuggly fitting into depressions 16 in the demarcated playing zone 4. Likewise, other means for removably attaching the null units 10 to the demarcated playing zone 4 also include, but are not limited to, Velcro, snap fittings (such as used on clothing or on Lego® building blocks), screw fittings, magnetism, gravity, etc. In addition, when the playing surface 2 is a computer screen or other essentially two-dimensional means for displaying the playing surface 2, the null units 10 are merely displayed on or merely displayed as being associated with the essentially two-dimensional means for displaying the playing surface 2.

In the embodiment of the invention shown in FIG. 1, the amount of free positive units 6 and free negative units 8 in the demarcated playing zone 4 are measured along the axis 12. As shown in FIG. 1, the axis 12 is numbered from 10 to −10. However, the axis 12 could just as well be numbered from M to N, where M is a positive integer and N is a negative integer. Preferably, M is a positive integer from 5 to 50, more preferably from 10 to 25, and most preferably from 10 to 20. Similarly, N preferably is a negative integer from −5 to −50, more preferably from −10 to −25, and most preferably from −10 to −20. Usually, M is equal to the absolute value of N. Furthermore, other means such as a weighting scale, a unit counter, etc. can be used to measure the number of free positive units 6 and free negative units 8 within the demarcated playing zone 4. Also, the measuring means can be located inside or outside the demarcated playing zone 4 and, in fact, on or off the playing surface 2. When the playing surface 2 is the display media used in conjunction with a computerized version of one or more of the methods of the present invention, all that need be shown on the display media is the number of free positive units 6 and/or the number of free negative units 8 that are within the demarcated playing zone 4.

Figure 2:
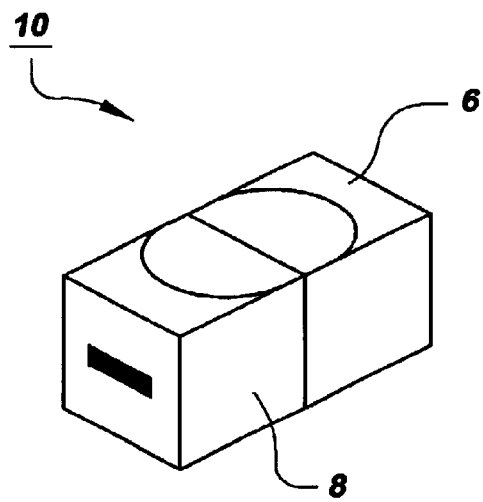
FIG. 2 is an isometric view of a null unit employed in the methods of the present invention showing a negative sign on one of the two constituent components of the null unit.
Figure 3:
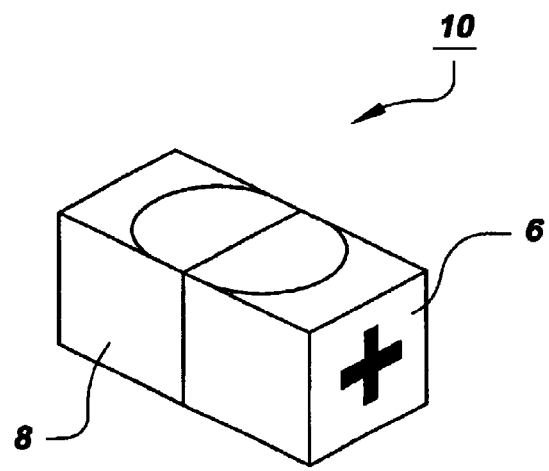
FIG. 3 is another isometric view of a null unit employed in the methods of the present invention showing a positive sign on one of the two constituent components of the null unit.

As shown in more detail in FIGS. 2 and 3, each null unit 10 consists of a positive unit 6 removably attached to a negative unit 8. However, the null unit 10 can consist of a plurality of positive units 6 and a plurality of negative units 8 removably attached together, provided that the number of positive units 6 and the number of negative units 8 per null unit 10 are equal. Nevertheless, the null unit 10 preferably consists of a single positive unit 6 removably attached to a single negative unit 8.

Figure 4:
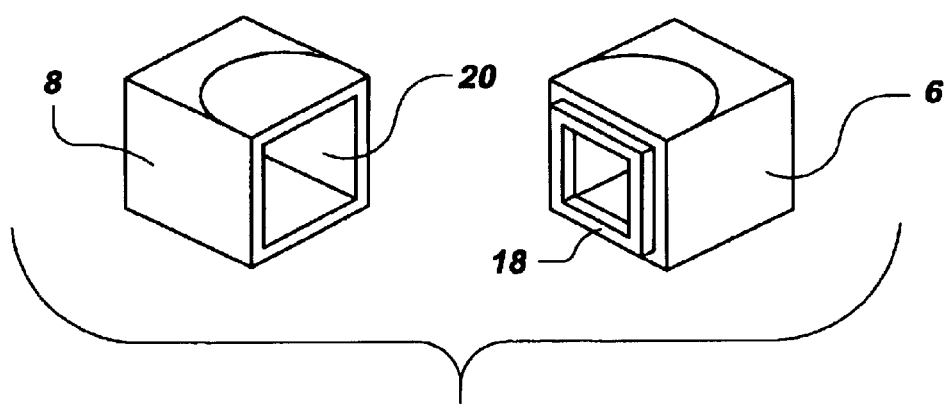
FIG. 4 is an isomeric view of a null unit separated into its two constituent halves, namely, the positive component or unit and the negative component or unit.

In the embodiment of the invention shown in FIG. 4, the positive unit 6 has a neck 18 that is adapted to snuggly fit into an opening 20 in the negative unit 8 to form the null unit 10. Other means for removably attaching the positive units 6 to the negative units 8 to form the null units 10 include, but are not limited to, Velcro, snap fittings (such as used on clothing or on Lego® building blocks), screw fittings, magnetism, etc. In addition, when the playing surface 2 is a computer screen or other essentially two-dimensional means for displaying the playing surface 2, the positive unit 6 and negative unit 8 portions of each null unit 10 are merely displayed in close proximity (i.e., as being associated with one another) on the essentially two-dimensional means for displaying the playing surface 2.

The game apparatus of the present invention is employed in conjunction with methods for adding, subtracting, multiplying, and dividing positive and negative numbers. In particular, the method of the present invention for adding and subtracting positive and negative numbers comprises the following steps:

Step A:

Play begins in a null state where a demarcated playing zone 4 comprises a plurality of null units 10, with each null unit 10 comprising at least one positive unit 6 reversibly attached to or associated with at least one negative unit 8, the number of positive units 6 and negative units 8 per null unit 10 being equal.

Step B:

Take the first mathematical operation in a mathematical problem $X_1 S_m X_m S_n X_n \ldots S_z X_z$ where the mathematical expressions $X_1$, $X_m$, $X_n$, and $X_z$ are independently selected from the group consisting of positive numbers, negative numbers, and combinations thereof, the mathematical operators $S_m$, $S_n$, and $S_z$ are independently selected from the group consisting of the addition operation and the subtraction operation, m is selected from the group consisting of 0 and 2, n is selected from the group consisting of 0 and 3, provided that if m is 0, n is 0, and z is selected from the group consisting of 0 and whole integers greater that 3, provided that if m is 0, z is 0, and perform the first mathematical operation $X_1$ as follows:

1. If $X_1$ is a positive number, then the mathematical operation of step (B) comprises moving or adding $X_1$ free positive units 6 to the demarcated playing zone 4.

2. If $X_1$ is a negative number, then the mathematical operation of step (B) comprises moving or adding the absolute value of $X_1$ free negative units 8 to the demarcated playing zone 4.

Alternatively, the mathematical operation indicated by the first mathematical expression $X_1$ can be performed as follows:

1. If $X_1$ is a positive number, then the mathematical operation of step (B) can be accomplished by breaking apart or separating $X_1$ null units 10 that are within the demarcated playing zone 4 into $X_1$ free positive units 6 and into $X_1$ free negative units 8 and removing or subtracting the $X_1$ free negative units 8 from the demarcated playing zone 4.

2. If $X_1$ is a negative number, then the mathematical operation of step (B) can be accomplished by breaking apart or separating the absolute value of $X_1$ null units 10 that are within the demarcated playing zone 4 into the absolute value of $X_1$ free positive units 6 and into the absolute value of $X_1$ free negative units 8 and removing or subtracting the absolute value of $X_1$ free positive units 6 from the demarcated playing zone.

Step C:

Take the second mathematical operation $S_2X_2$ in the mathematical problem, where $S_2$ is selected from the group consisting of the addition operation and the subtraction operation and $X_2$ is selected from the group consisting of positive and negative numbers, and perform the mathematical operation indicated by $S_2X_2$ as follows:

1. When $S_2$ is an addition operation and $X_2$ is a positive number (e.g., +(+3)), then step (C) comprises moving or adding $X_2$ free positive units 6 to the demarcated playing zone 4 and, if there are any free negative units 8 within the demarcated playing zone 4, then step (C) further comprises combining up to $X_2$ free negative units 8 that are already inside the demarcated playing zone 4 with up to the $X_2$ free positive units 6 that were moved into the demarcated playing zone 4.

2a. When $S_2$ is a subtraction operation and $X_2$ is a positive number (e.g., -(+3)), then step (C) comprises removing or subtracting $X_2$ free positive units 6 from the demarcated playing zone 4 and, if there are not $X_2$ free positive units 6 within the demarcated play zone 4 to remove from the demarcated zone 4, then step (C) further comprises breaking apart or separating enough null units 10 that are within the demarcated playing zone 4 to obtain up to the required $X_2$ free positive units 6 and removing the $X_2$ free positive units 6 from the demarcated playing zone 4.

2b. Alternatively, when $S_2$ is a subtraction operation and $X_2$ is a positive number (e.g., -(+3)), then step (C) can also be accomplished by moving or adding $X_2$ free negative units 8 to the demarcated playing zone 4 and, if there are any free positive units 6 within the demarcated playing zone 4, then step (C) further comprises combining up to $X_2$ free positive units 6 that are already inside the demarcated playing zone 4 with up to the $X_2$ free negative units 8 that were moved into the demarcated playing zone.

3a. When $S_2$ is an addition operation and $X_2$ is a negative number (e.g., +(-3)), then step (C) comprises moving or adding the absolute value of $X_2$ free negative units 8 to the demarcated playing zone 4 and, if there are any free positive units 6 within the demarcated playing zone 4, then step (C) further comprises combining up to the absolute value of $X_2$ free positive units 6 that are already within the demarcated playing zone 4 with up to the absolute value of $X_2$ free negative units 8 that were moved into the demarcated playing zone 4.

3b. Alternatively, when $S_2$ is an addition operation and $X_2$ is a negative number (e.g., +(-3)), then step (C) can also be accomplished by removing or subtracting $X_2$ free positive units 6 from the demarcated playing zone 4 and, if there are not $X_2$ free positive units 6 within the demarcated play zone 4 to remove from the demarcated zone 4, then step (C) further comprises breaking apart or separating enough null units 10 that are within the demarcated playing zone 4 to obtain up to the required $X_2$ free positive units 6 and removing the $X_2$ free positive units 6 from the demarcated playing zone 4.

4. When $S_2$ is a subtraction operation and $X_2$ is a negative number (e.g.,-(-3)), then step (C) comprises removing or subtracting the absolute value of $X_2$ free negative units 8 from the demarcated playing zone 4 and, if there are not enough absolute value of $X_2$ free negative units 8 within the demarcated play zone 4 to remove from the demarcated playing zone 4, then step (C) further comprises breaking apart or separating enough null units 10 that are within the demarcated playing zone 4 to obtain up to the required absolute value of $X_2$ free negative units 8 and removing the absolute value of $X_2$ free negative units 8 from the demarcated playing zone 4.

Step D:

Repeat step (C) for each of the remaining mathematical operations $S_nX_n$ through $S_zX_z$ in the problem, where $X_n$ through $X_z$ are independently selected from the group consisting of positive numbers, negative numbers, and combinations thereof, and the mathematical operators $S_n$ through $S_z$ are independently selected from the group consisting of the addition operation and the subtraction operation.

The method of the present invention for adding and subtracting positive and negative numbers is further illustrated in the following Example 1, which is intended to demonstrate, and not limit, the present invention:

EXAMPLE 1

Solve the Equation for x: 10+(-20)-(-15)-5+3=x

Initially, the demarcated playing zone 4 is in the null state as shown in FIG. 1. In the null state, there are no free positive units 6 or free negative units 8 in the demarcated playing zone 4.

The first step in solving the above equation is to write the equation in full as follows:

+10+(-20)-(-15)-(+5)+(+3)=x

In discussing the solution to foregoing equation, each element of the equation shall be identified as follows:

$X_1S_2X_2S_3X_3S_4X_4S_5X_5$

+10+(-20)-(-15)-(+5)+(+3)=x

Figure 5:
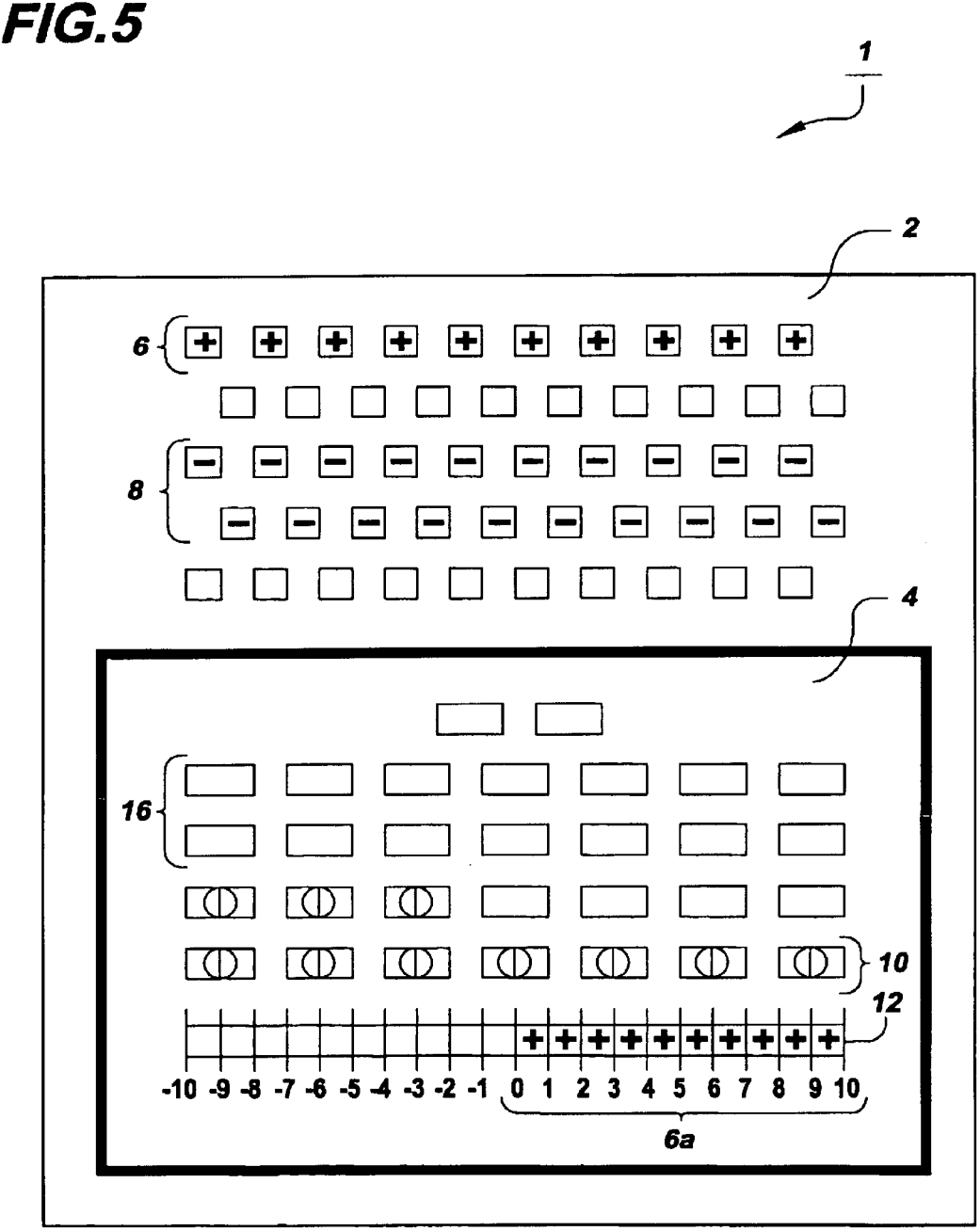
FIG. 5 is a top view of a playing surface employed in the methods of the present invention modified in accordance with the first mathematical operation of the mathematical problem of Example 1.

With respect to the mathematical expression $X_1$, $X_1$ is the initial disturbed state of the demarcated playing zone 4. As shown in FIG. 5, the initial disturbed state of the demarcated playing zone 4 is achieved by moving or adding 10 free positive units 6a to the demarcated playing zone 4. The 10 free positive units 6a moved into the demarcated playing zone 4 are measured by placing them in the first 10 positive spaces along the axis 12.

Figure 6:
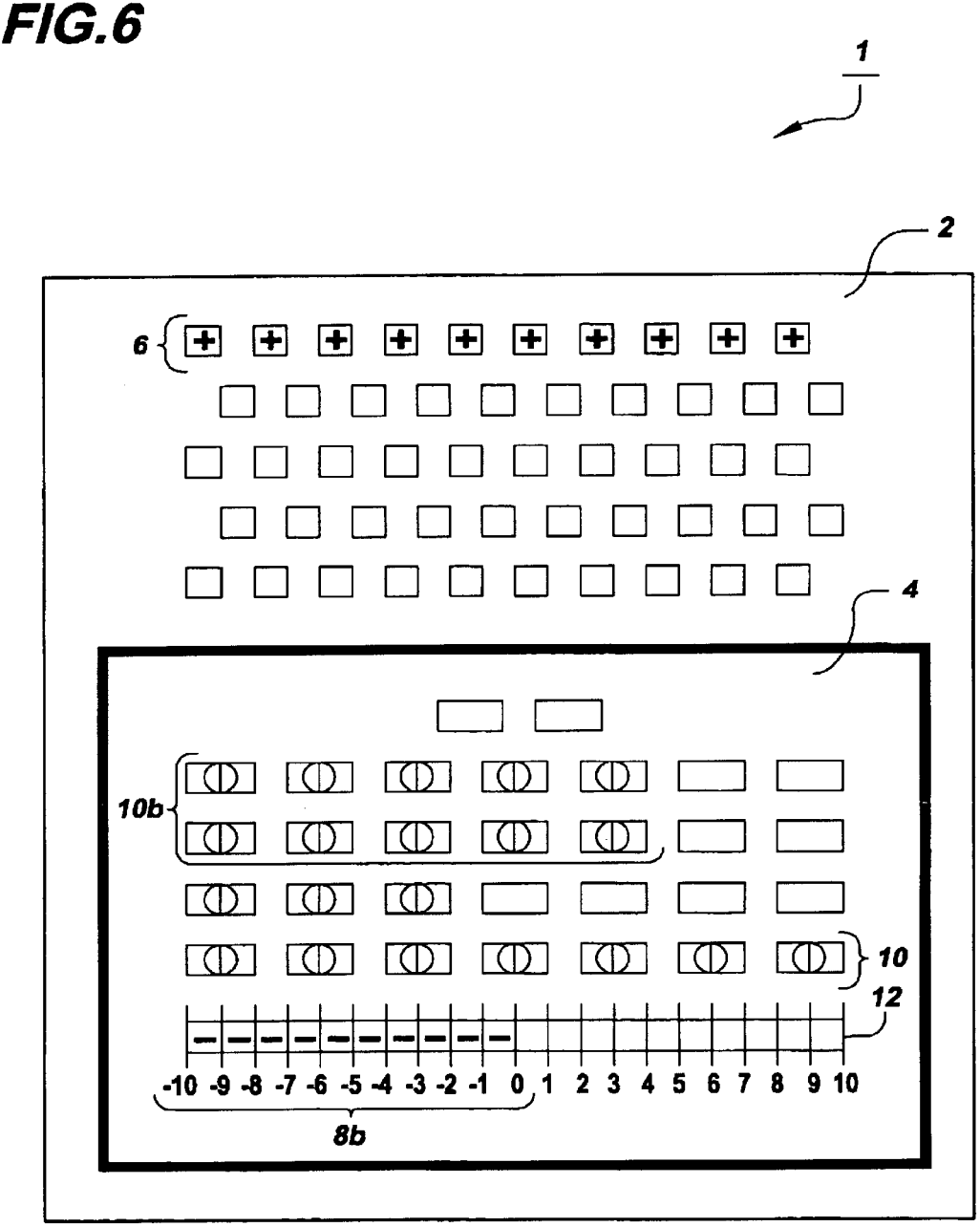
FIG. 6 is a top view of a playing surface employed in the methods of the present invention modified in accordance with the first through second mathematical operations of the mathematical problem of Example 1.

Regarding the mathematical operator $S_2$, $S_2$ is "+", i.e., a positive sign, which denotes that the mathematical expression $X_2$ is to be transported into (i.e., added to) the demarcated playing zone 4. $X_2$ is -20 (i.e., 20 negative units 8). As shown in FIG. 6, 10 of the 20 negative units 8 that are moved or added to the demarcated playing zone 4 combine with the 10 free positive units 6a (see FIG. 5) already in the demarcated playing zone 4 to form 10 null units 10b. The remaining 10 free negative units 8b moved into the demarcated playing zone 4 are measured by placing them in the first 10 negative spaces along the axis 12.

Figure 7:
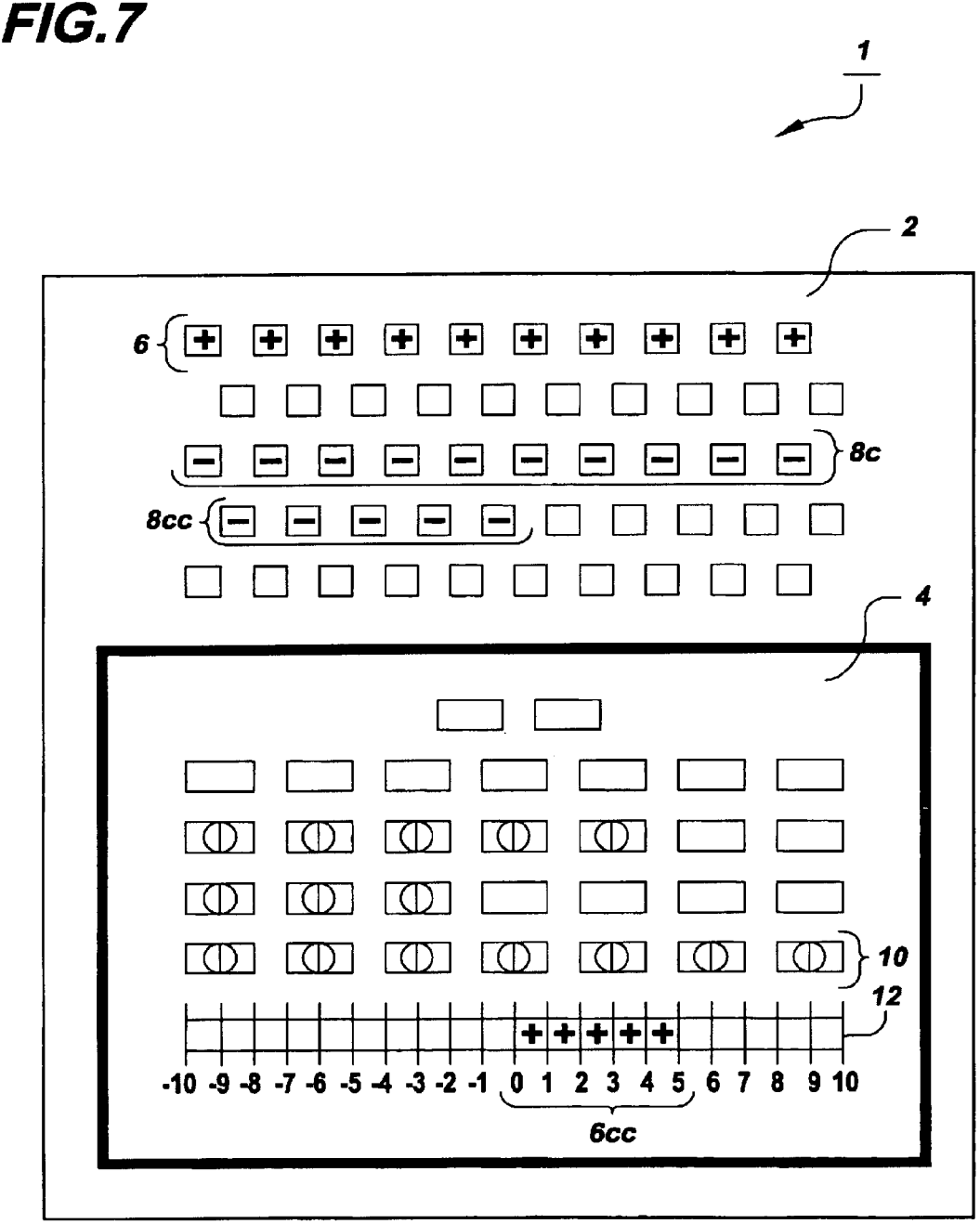
FIG. 7 is a top view of a playing surface employed in the methods of the present invention modified in accordance with the first through third mathematical operations of the mathematical problem of Example 1.

As to the mathematical operator $S_3$, $S_3$ is "−", i.e., a negative sign, which denotes that the mathematical expression $X_3$ is to be transported out of (i.e., subtracted from) the demarcated playing zone 4. $X_3$ is −15 (i.e., 15 negative units 8). As shown in FIG. 7, 10 of the 15 negative units 8c that are to be removed from the demarcated playing zone 4 are present in the demarcated playing zone 4 as free negative units 8b of FIG. 6. The remaining 5 negative units 8cc to be transported out of the demarcated playing zone 4 are obtained by taking 5 null units 10 from within the demarcated playing zone 4, breaking or separating these 5 null units 10 into their component parts, namely, 5 free positive units 6cc and 5 free negative units 8cc, removing the thus obtained 5 free negative units 8cc from the demarcated playing zone 4, and placing the remaining 5 free positive units 6cc in the first 5 positive spaces along the axis 12.

Figure 8:
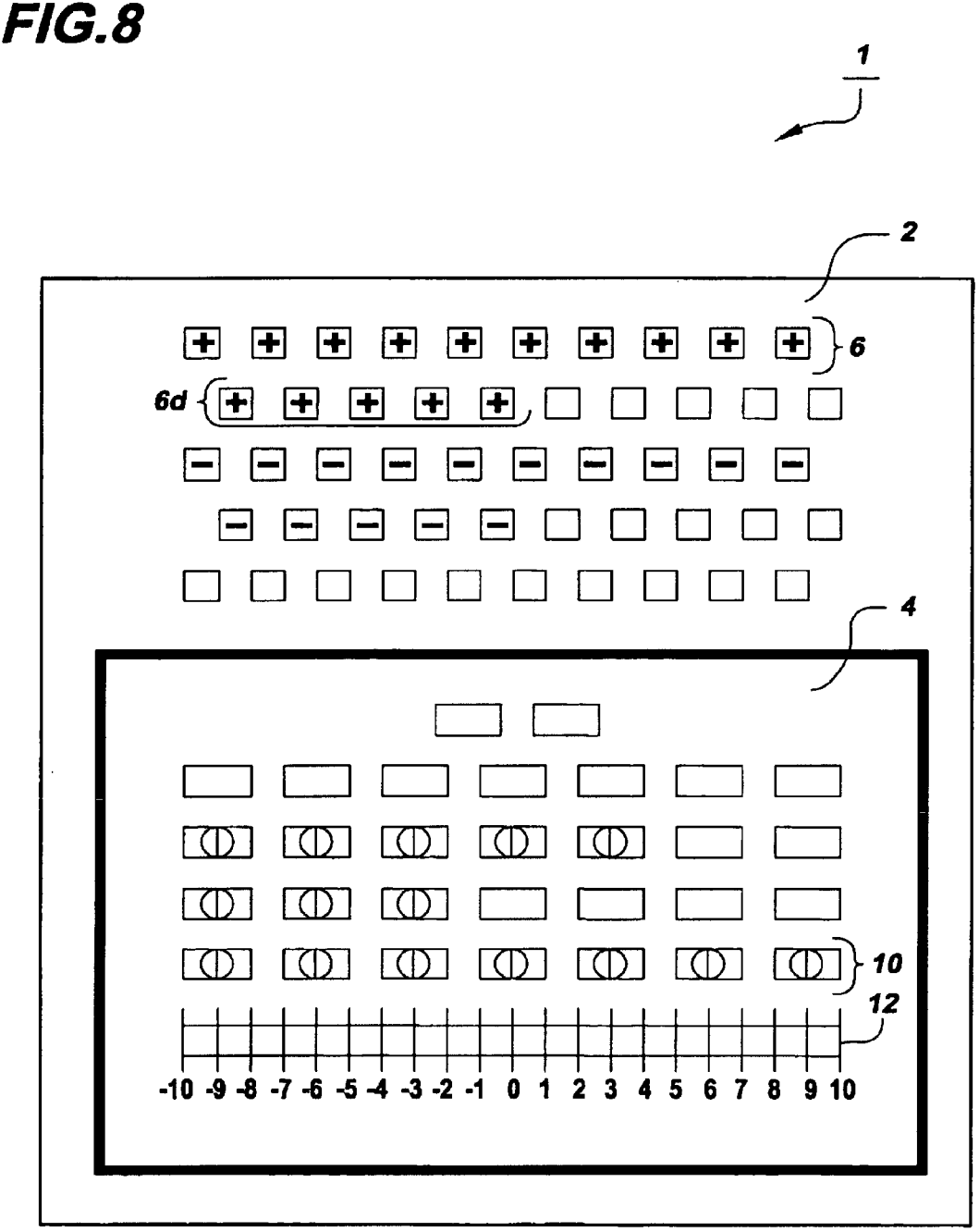
FIG. 8 is a top view of a playing surface employed in the methods of the present invention modified in accordance with the first through fourth mathematical operations of the mathematical problem of Example 1.

With respect to the mathematical operator $S_4$, $S_4$ is "−", i.e., a negative sign, which denotes that the mathematical expression $X_4$ is to be transported out of (i.e., subtracted from) the demarcated playing zone 4. $X_4$ is +5 (i.e., 5 positive units 6). As shown in FIG. 8, all of the 5 positive units $6_d$ that were moved out of or subtracted from the demarcated playing zone 4 were already present in the demarcated playing zone 4 as free positive units 6cc shown in FIG. 7.

Figure 9:
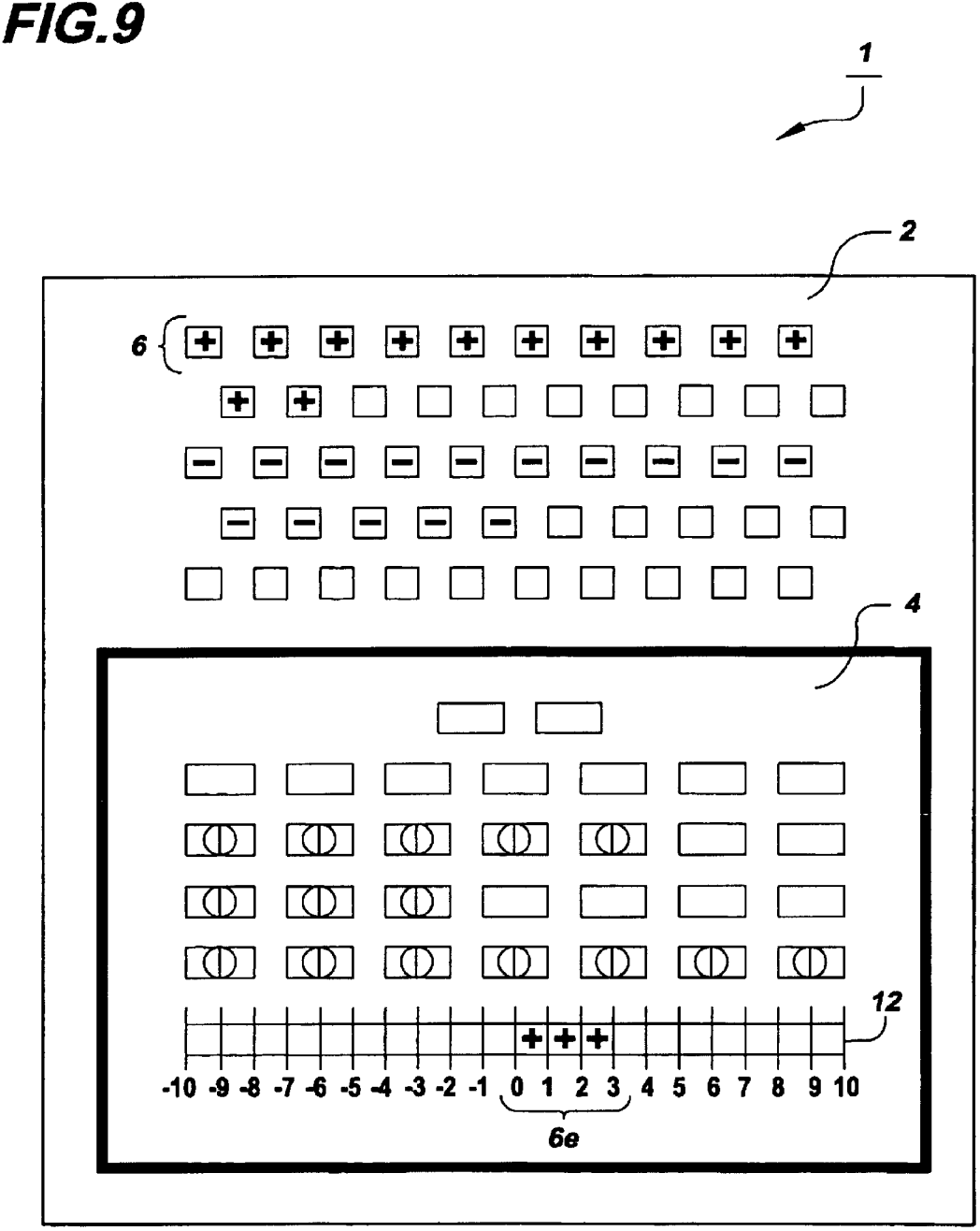
FIG. 9 is a top view of a playing surface employed in the methods of the present invention modified in accordance with the first through fifth mathematical operations of the mathematical problem of Example 1.

Regarding the mathematical operator $S_5$, $S_5$ is "+", i.e., a positive sign, which denotes that the mathematical expression $X_5$ is to be transported into (i.e., added to) the demarcated playing zone 4. $X_5$ is +3 (i.e., 3 positive units 6). As shown in FIG. 9, since there are no free positive units 6 or free negative units 8 in the demarcated playing zone 4, the 3 free positive units 6e moved into the demarcated playing zone 4 are measured by placing them in the first 3 positive spaces along the axis 12.

Accordingly, x equals 3.

It should be noted that the above solution would also be achieved if the above-discussed alternative method of treating the signs were employed in solving the equation.

In the case of multiplying positive and negative numbers, the method of the present invention comprises the following steps:

Step A:

Play begins in a null state where a demarcated playing zone 4 comprises a plurality of null units 10, with each null unit 10 comprising at least one positive unit 6 reversibly attached to at least one negative unit 8, the number of positive units 6 and negative units 8 per null unit 10 being equal.

Step B

In this instance, $X_1$ is a multiplication expression $(S_xM_1)(S_yN_1)$, where $S_x$ and $S_y$ are independently selected from the group consisting of a positive sign and a negative sign, $M_1$ is the absolute value of a number, and $N_1$ is the absolute value of a number. The multiplication expression $(S_xM_1)(S_yN_1)$ is solved as follows:

1. If $S_x$ and $S_y$ are positive signs, move or add the absolute value of $(M_1)(N_1)$ positive units 6 to the demarcated playing zone 4. Since the demarcated playing zone 4 is initially in the null state, there are initially no free positive units 6 or free negative units 8 in the demarcated playing zone 4. Accordingly, after adding the absolute value of $(M_1)(N_1)$ positive units 6 to the demarcated playing zone 4 as required by step (B)(1), the total number of free positive units 6 in the demarcated playing zone 4 is the absolute value of $(M_1)(N_1)$.

2a. If $S_x$ is a positive sign and $S_y$ is a negative sign, remove or subtract the absolute value of $(M_1)(N_1)$ positive units 6 from the demarcated playing zone 4. Since the demarcated playing zone 4 is initially in the null state, the free positive units 6 are removed from the demarcated playing zone 4 by taking the absolute value of $(M_1)(M_1)$ null units 10 that are within the demarcated playing zone 4, breaking or separating them into their constituent positive units 6 and negative units 8, and removing the absolute value of $(M_1)(N_1)$ positive units 6 from the demarcated playing zone 4. Thus, the absolute value of $(M_1)(N_1)$ negative units 8 are left behind in the demarcated playing zone 4.

2b. Alternatively, when $S_x$ is a positive sign and $S_y$ is a negative sign, the step (B) can also be accomplished by moving or adding the absolute value of $(M_1)(N_1)$ negative units 8 to the demarcated playing zone 4. Since the demarcated playing zone 4 is initially in the null state, there are initially no free positive units 6 or free negative units 8 in the demarcated playing zone 4. Accordingly, after adding the absolute value of $(M_1)(N_1)$ negative units 8 to the demarcated playing zone 4 as required by step (B)(2b), the total number of free negative units 8 in the demarcated playing zone 4 is the absolute value of $(M_1)(N_1)$.

3a. If $S_x$ is a negative sign and $S_y$ is a positive sign, move or add the absolute value of $(M_1)(N_1)$ negative units 8 to the demarcated playing zone 4. Since the demarcated playing zone 4 is initially in the null state, there are initially no free positive units 6 or free negative units 8 in the demarcated playing zone 4. Accordingly, after adding the absolute value of $(M_1)(N_1)$ negative units 8 to the demarcated playing zone 4 as required by step (B)(3), the total number of free negative units 8 in the demarcated playing zone 4 is the absolute value of $(M_1)(M_1)$.

3b. Alternatively, when $S_x$ is a negative sign and $S_y$ is a positive sign, then step (B) can also be accomplished by removing or subtracting the absolute value of $(M_1)(M_1)$ positive units 6 from the demarcated playing zone 4. Since the demarcated playing zone is initially in the null state, the free positive units 6 are removed from the demarcated playing zone 4 by taking the absolute value of $(M_1)(N_1)$ null units 10 that are within the demarcated playing zone 4, breaking or separating them into their constituent positive units 6 and negative units 8, and removing the absolute value of $(M_1)(N_1)$ positive units 6 from the demarcated playing zone 4. Thus, the absolute value of $(M_1)(N_1)$ negative units 8 are left behind in the demarcated playing zone 4.

4. If $S_x$ and $S_y$ are negative signs, remove or subtract the absolute value of $(M_1)(N_1)$ negative units 8 from the demarcated playing zone 4. Since the demarcated playing zone 4 is initially in the null state, the free negative units 8 are removed from the demarcated playing zone 4 by taking the absolute value of $(M_1)(N_1)$ null units 10 that are within the demarcated playing zone 4, breaking or separating them into their constituent positive units 6 and negative units 8, and removing the absolute value of $(M_1)(N_1)$ negative units 8 from the demarcated playing zone 4. Thus, the absolute value of $(M_1)(N_1)$ positive units 6 are left behind in the demarcated playing zone 4.

The method of the present invention for multiplying positive and negative numbers is illustrated in the following Examples 2 through 5, which are also intended to demonstrate, and not limit, the present invention:

EXAMPLE 2

Solve the Equation for x: (2)(5)=x

Initially, the demarcated playing zone 4 is in the null state as shown in FIG. 1. In the null state, there are no free positive units 6 or free negative units 8 in the demarcated playing zone 4.

The first step in solving the above equation is to write the equation in full as follows:

(+2)(+5)=x

Figure 12:
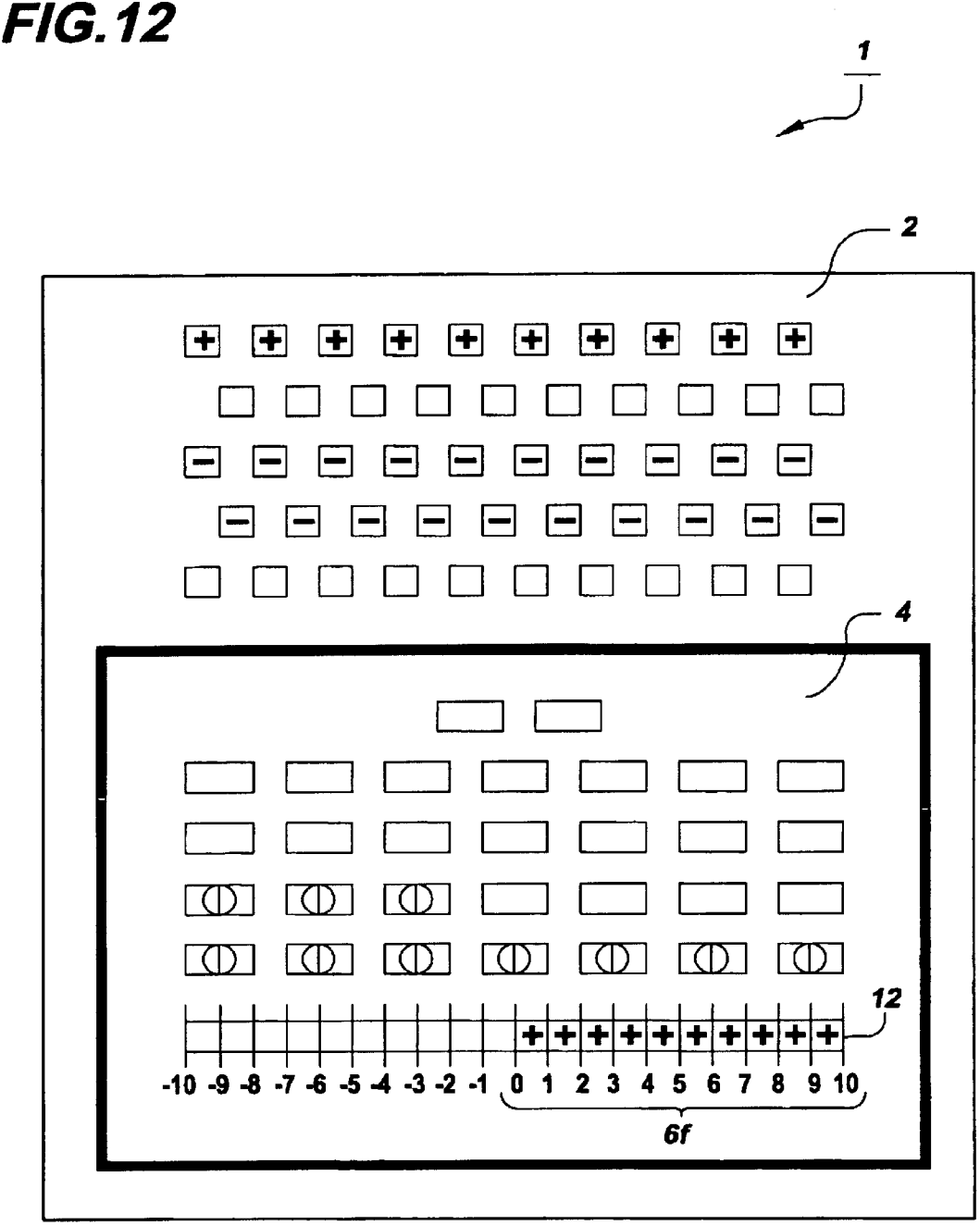
FIG. 12 is a top view of a playing surface employed in the methods of the present invention modified in accordance with the multiplication problem of Example 2.

As shown in FIG. 12, the mathematical expression (+2)(+5) is solved by moving or adding (2)(5) or 10 positive units 6f into the demarcated playing zone 4. Accordingly, as shown in FIG. 12, x equals +10.

EXAMPLE 3

Solve the Equation for x: (3)(−3)=x

Initially, the demarcated playing zone 4 is in the null state as shown in FIG. 1. In the null state, there are no free positive units 6 or free negative units 8 in the demarcated playing zone 4.

The first step in solving the above equation is to write the equation in full as follows:

(+3)(−3)=x

Figure 13:
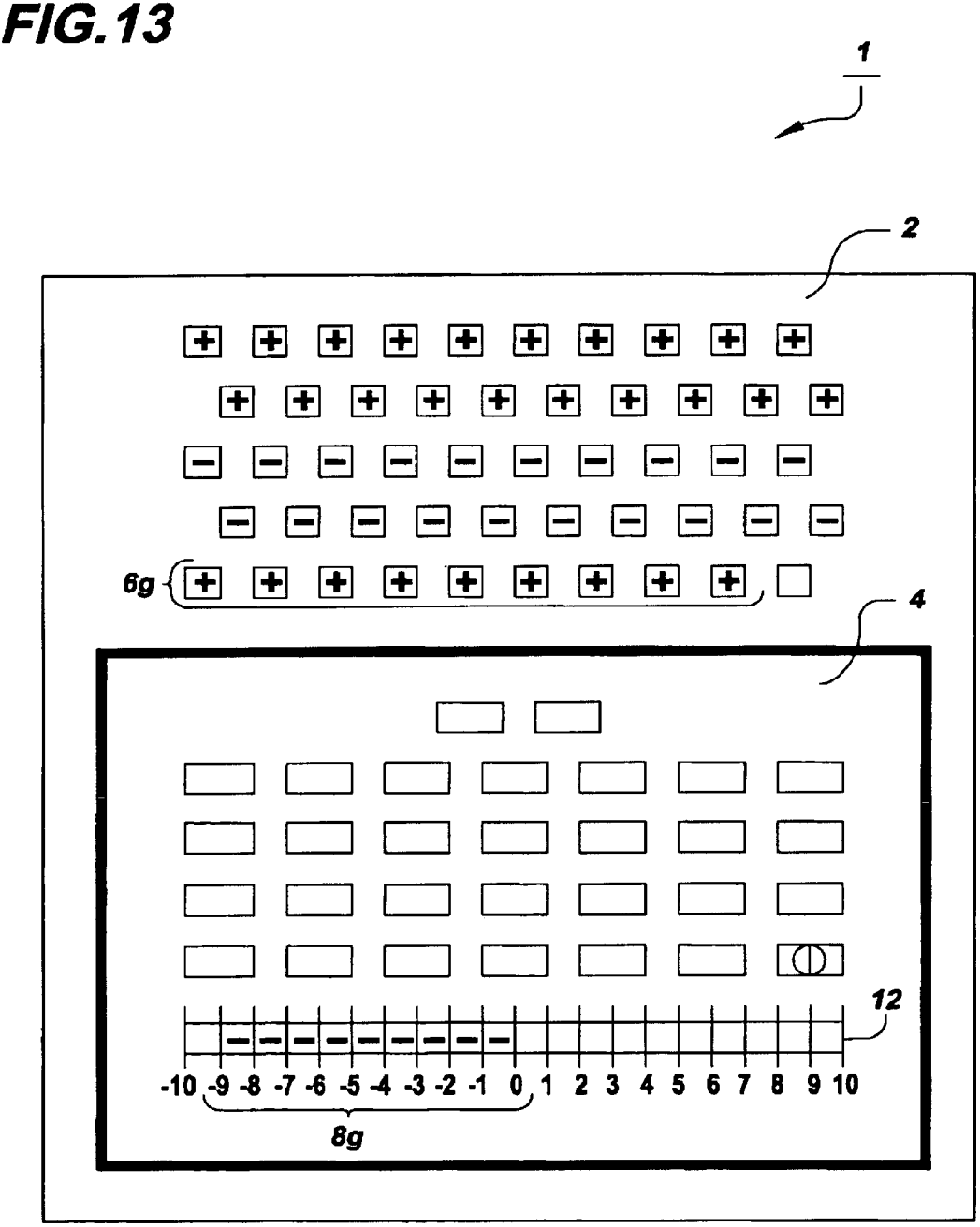
FIG. 13 is a top view of a playing surface employed in the methods of the present invention modified in accordance with the multiplication problem of Example 3.

As shown in FIG. 13, the mathematical expression (+3)(−3) is solved by removing or subtracting (3)(3) or 9 positive units 6g from the demarcated playing zone 4. Since there are initially no free positive units 6 in the demarcated playing zone 4, this is accomplished by taking 9 null units 10 that are within the demarcated playing zone 4, breaking or separating them into their constituent positive units 6g and negative units 8g, and removing 9 positive units 6g from the demarcated playing zone 4. Thus, 9 negative units 8g are left behind in the demarcated playing zone 4 and, as shown in FIG. 13, x equals −9.

EXAMPLE 4

Solve the Equation for x: (−2)(4)=x

Initially, the demarcated playing zone 4 is in the null state as shown in FIG. 1. In the null state, there are no free positive units 6 or free negative units 8 in the demarcated playing zone 4.

The first step in solving the above equation is to write the equation in full as follows:

(−2)(+4)=x

Figure 14:
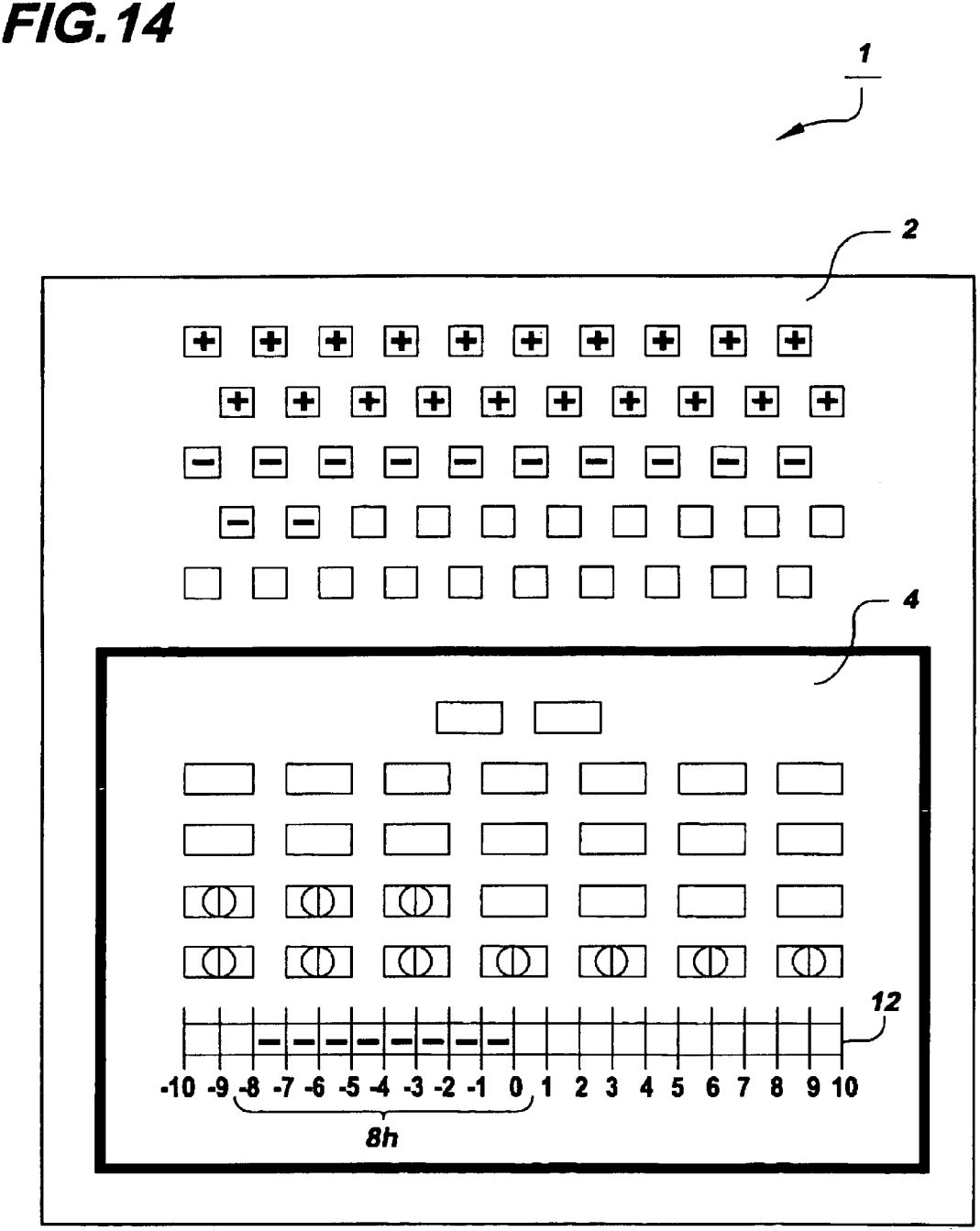
FIG. 14 is a top view of a playing surface employed in the methods of the present invention modified in accordance with the multiplication problem of Example 4.

As shown in FIG. 14, the mathematical expression (−2)(+4) is solved by moving or adding (2)(4) or 8 negative units 8h into the demarcated playing zone 4. Accordingly, as shown in FIG. 14, x equals −8.

EXAMPLE 5

Solve the Equation for x: (−5)(−2)=x

Initially, the demarcated playing zone 4 is in the null state as shown in FIG. 1. In the null state, there are no free positive units 6 or free negative units 8 in the demarcated playing zone 4.

It should be noted that the above equation is already written out in full.

Figure 15:
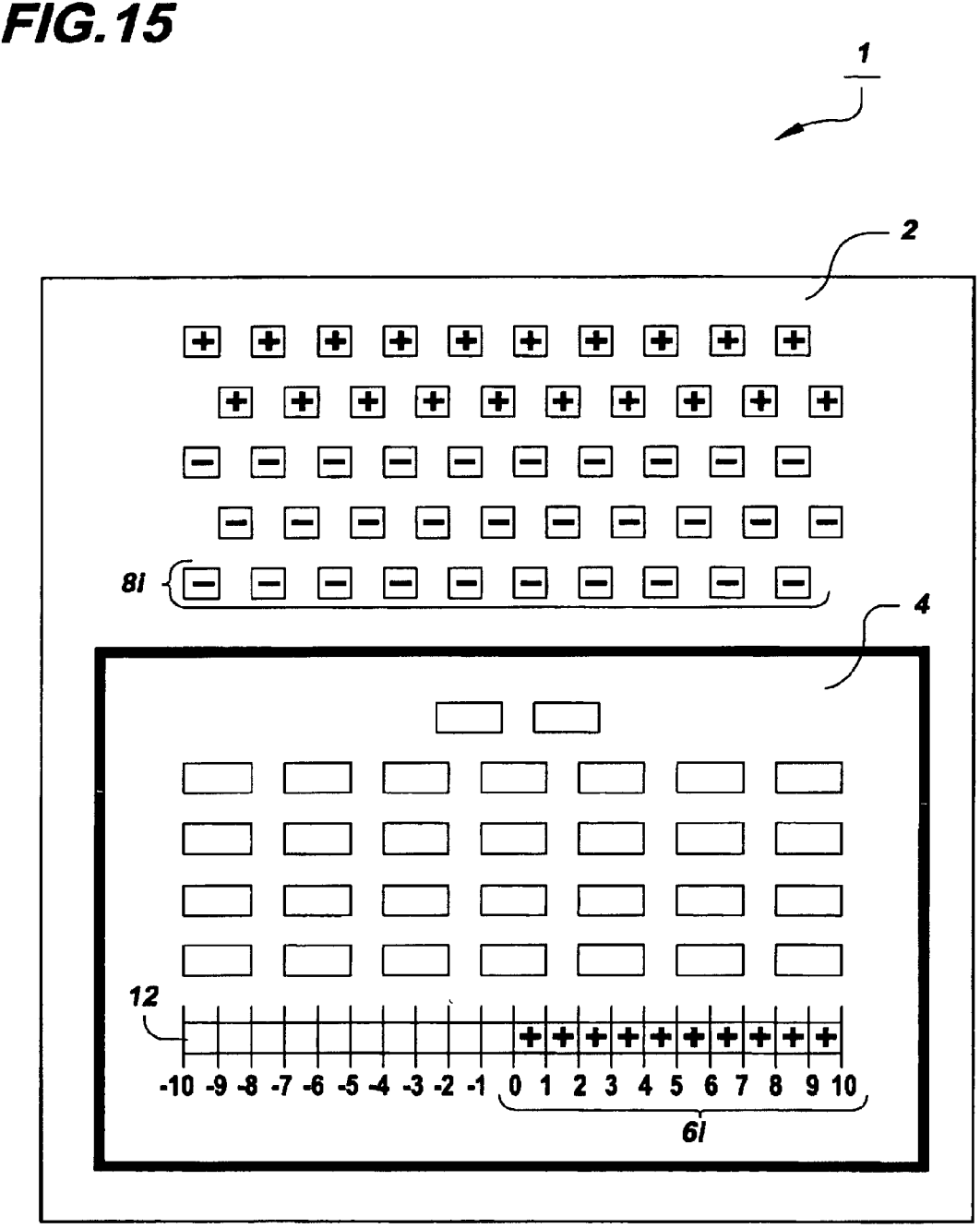
FIG. 15 is a top view of a playing surface employed in the methods of the present invention modified in accordance with the multiplication problem of Example 5.

As shown in FIG. 15, the mathematical expression (−5)(−2) is solved by removing or subtracting (5)(2) or 10 negative units 8i from the demarcated playing zone 4. Since there are initially no free negative units 8 in the demarcated playing zone 4, this is accomplished by taking 10 null units 10 that are within the demarcated playing zone 4, breaking or separating them into their constituent positive units 6i and negative units 8i, and removing 10 negative units 8i from the demarcated playing zone 4. Thus, 10 positive units 6i are left behind in the demarcated playing zone 4 and, as shown in FIG. 15, x equals +10.

It should be noted that, if the above-discussed alternative method of treating the signs were employed in solving the multiplication expressions of above Examples 2 through 5, the answers would be the same.

As for the case of dividing positive and negative numbers, the method of the present invention comprises the following steps:

Step A:

Play begins in a null state where a demarcated playing zone 4 comprises a plurality of null units 10, with each null unit 10 comprising at least one positive unit 6 reversibly attached to at least one negative unit 8, the number of positive units 6 and negative units 8 per null unit 10 being equal.

Step B

In this instance, $X_1$ is a division expression $(S_{xx}M_1)/(S_{yy}N_1)$, where $S_{xx}$ and $S_{yy}$ are independently selected from the group consisting of a positive sign and a negative sign, $M_1$ is the absolute value of a number, and $N_1$ is the absolute value of a number. The division expression $(S_{xx}M_1)(S_{yy}N_1)$ is solved as follows:

1. If $S_{xx}$ and $S_{yy}$ are positive signs, move or add the absolute value of $(M_1)/(N_1)$ positive units 6 to the demarcated playing zone 4. Since the demarcated playing zone 4 is initially in the null state, there are initially no free positive units 6 or free negative units 8 in the demarcated playing zone 4. Accordingly, after adding the absolute value of $(M_1)/(N_1)$ positive units 6 to the demarcated playing zone 4 as required by step (B)(1), the total number of free positive units 6 in the demarcated playing zone 4 is the absolute value of $(M_1)/(N_1)$.

2a. If $S_{xx}$ is a positive sign and $S_{yy}$ is a negative sign, remove or subtract the absolute value of $(M_1)/(N_1)$ positive units 6 from the demarcated playing zone 4. Since the demarcated playing zone 4 is initially in the null state, the free positive units 6 are removed from the demarcated playing zone 4 by taking the absolute value of $(M_1)/(N_1)$ null units 10 that are within the demarcated playing zone 4, breaking or separating them into their constituent positive units 6 and negative units 8, and removing the absolute value of $(M_1)/(N_1)$ positive units 6 from the demarcated playing zone 4. Thus, the absolute value of $(M_1)/(N_1)$ negative units 8 are left behind in the demarcated playing zone 4.

2b. Alternatively, when $S_{xx}$ is a positive sign and $S_{yy}$ is a negative sign, then step (B) can also be accomplished by moving or adding the absolute value of $(M_1)/(N_1)$ negative units 8 to the demarcated playing zone 4. Since the demarcated playing zone 4 is initially in the null state, there are initially no free positive units 6 or free negative units 8 in the demarcated playing zone 4. Accordingly, after adding the absolute value of $(M_1)/(N_1)$ negative units 8 to the demarcated playing zone 4 as required by step (B)(2b), the total number of free negative units 8 in the demarcated playing zone is the absolute value of $(M_1)/(N_1)$.

3a. If $S_{xx}$ is a negative sign and $S_{yy}$ is a positive sign, move or add the absolute value of $(M_1)/(N_1)$ negative units 8 to the demarcated playing zone 4. Since the demarcated playing zone 4 is initially in the null state, there are initially no free positive units 6 or free negative units 8 in the demarcated playing zone 4. Accordingly, after adding the absolute value of $(M_1)/(N_1)$ negative units 8 to the demarcated playing zone 4 as required by step (B)(3), the total number of free negative units 8 in the demarcated playing zone 4 is the absolute value of $(M_1)/(N_1)$.

3b. Alternatively, when $S_{xx}$ is a negative sign and $S_{yy}$ is a positive sign, then step (B) can also be accomplished by removing or subtracting the absolute value of $(M_1)/(N_1)$ positive units 6 from the demarcated playing zone 4. Since the demarcated playing zone is initially in the null state, the free positive units 6 are removed from the demarcated playing zone 4 by taking the absolute value of $(M_1)/(N_1)$ null units 10 that are within the demarcated playing zone 4, breaking or separating them into their constituent positive units 6 and negative units 8, and removing the absolute value of $(M_1)/(N_1)$ positive units 6 from the demarcated playing zone 4. Thus, the absolute value of $(M_1)/(N_1)$ negative units 8 are left behind in the demarcated playing zone 4.

4. If $S_{xx}$, and $S_{yy}$ are negative signs, remove or subtract the absolute value of $(M_1)/(N_1)$ negative units 8 from the demarcated playing zone 4. Since the demarcated playing zone 4 is initially in the null state, the free negative units 8 are removed from the demarcated playing zone 4 by taking the absolute value of $(M_1)/(N_1)$ null units 10 that are within the demarcated playing zone 4, breaking or separating them into their constituent positive units 6 and negative units 8, and removing the absolute value of $(M_1)/(N_1)$ negative units 8 from the demarcated playing zone 4. Thus, the absolute value of $(M_1)/(N_1)$ positive units 6 are left behind in the demarcated playing zone 4.

The method of the present invention for dividing positive and negative numbers is illustrated in the following Examples 6 through 9, which are likewise intended to demonstrate, and not limit, the present invention:

EXAMPLE 6

Solve the Equation for x: $(20)/(5)=x$

Initially, the demarcated playing zone 4 is in the null state as shown in FIG. 1. In the null state, there are no free positive units 6 or free negative units 8 in the demarcated playing zone 4.

The first step in solving the above equation is to write the equation in full as follows:

$$(+20)/(+5)=x$$

Figure 16:
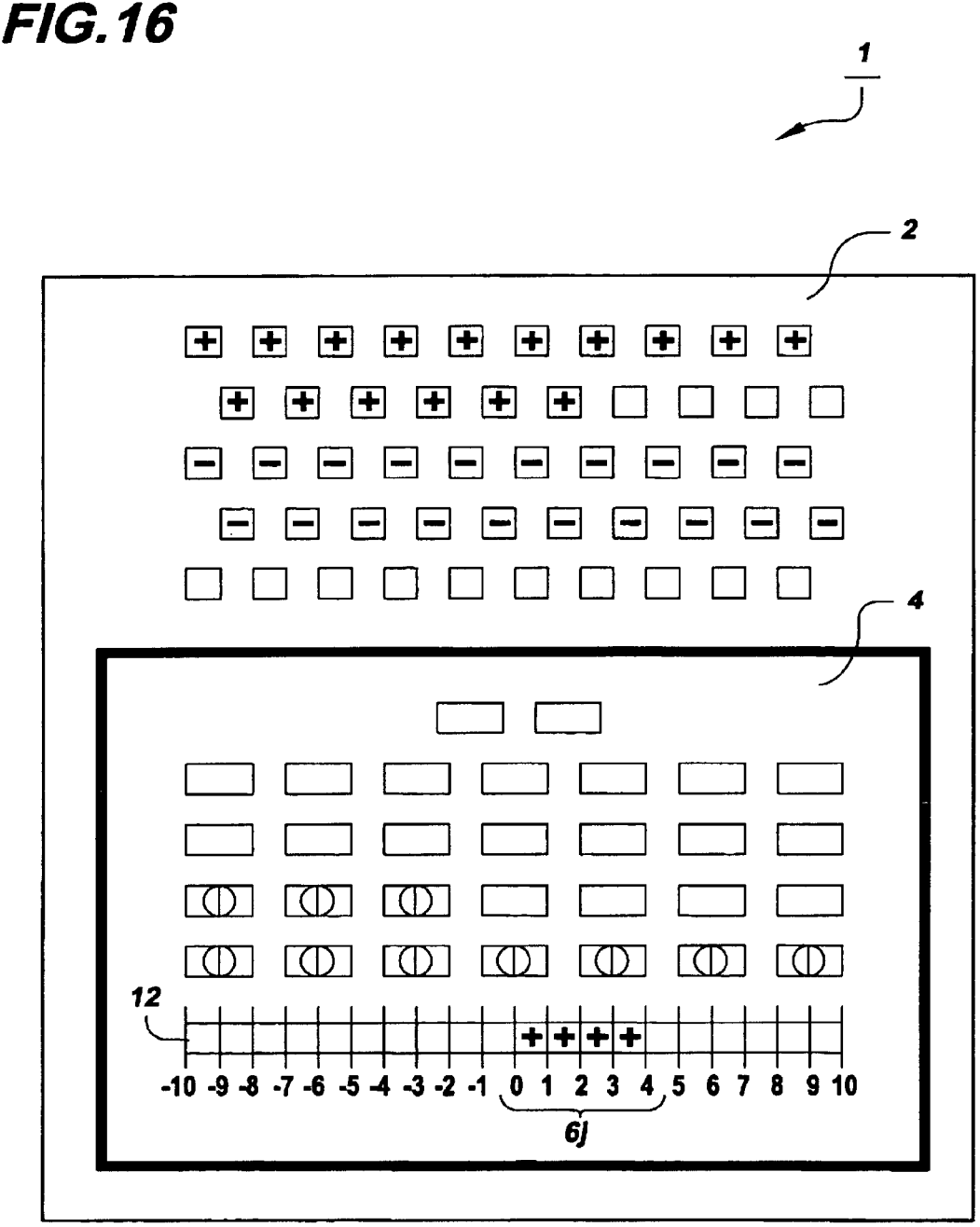
FIG. 16 is a top view of a playing surface employed in the methods of the present invention modified in accordance with the division problem of Example 6.

As shown in FIG. 16, the mathematical expression $(+20)/(+5)$ is solved by moving or adding $(20)/(5)$ or 4 positive units 6j to the demarcated playing zone 4. Accordingly, as shown in FIG. 16, x equals +4.

EXAMPLE 7

Solve the Equation for x: $(30)/(-3)=x$

Initially, the demarcated playing zone 4 is in the null state as shown in FIG. 1. In the null state, there are no free positive units 6 or free negative units 8 in the demarcated playing zone 4.

The first step in solving the above equation is to write the equation in full as follows:

$$(+30)/(-3)=x$$

Figure 17:
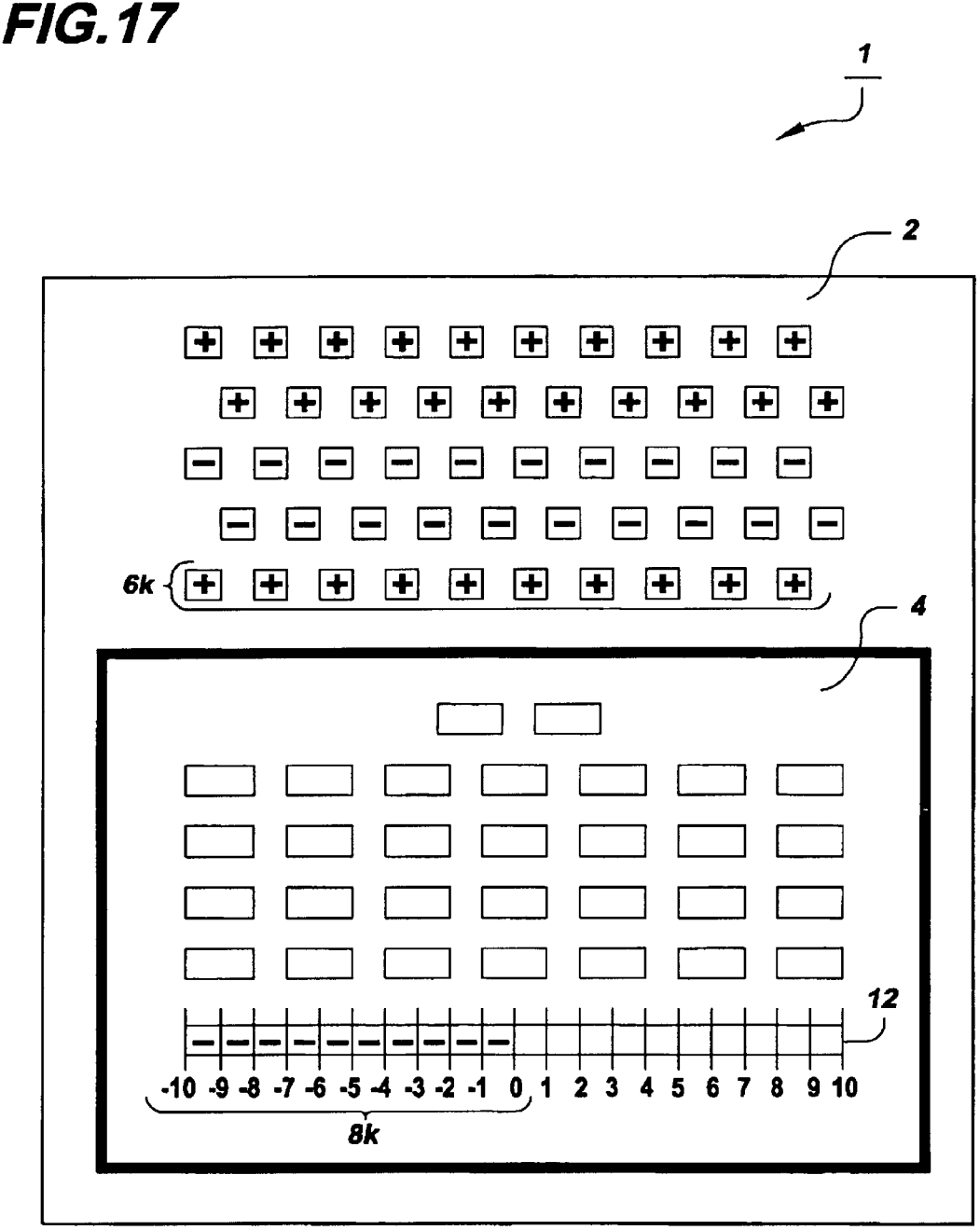
FIG. 17 is a top view of a playing surface employed in the methods of the present invention modified in accordance with the division problem of Example 7.

As shown in FIG. 17, the mathematical expression $(+30)/(-3)$ is solved by removing or subtracting $(30)/(3)$ or 10 positive units 6k from the demarcated playing zone 4. Since there are initially no free positive units 6 in the demarcated playing zone 4, this is accomplished by taking $(30)/(3)$ or 10 null units 10 that are in the demarcated playing zone 4, breaking or separating them into their constituent positive units 6k and negative units 8k, and removing 10 positive units 6k from the demarcated playing zone 4. Thus, 10 negative units 8k are left behind in the demarcated playing zone 4 and, as shown in FIG. 17, x equals −10.

EXAMPLE 8

Solve the Equation for x: $(-20)/(4)=x$

Initially, the demarcated playing zone 4 is in the null state as shown in FIG. 1. In the null state, there are no free positive units 6 or free negative units 8 in the demarcated playing zone 4.

The first step in solving the above equation is to write the equation in full as follows:

$$(-20)/(+4)=x$$

Figure 18:
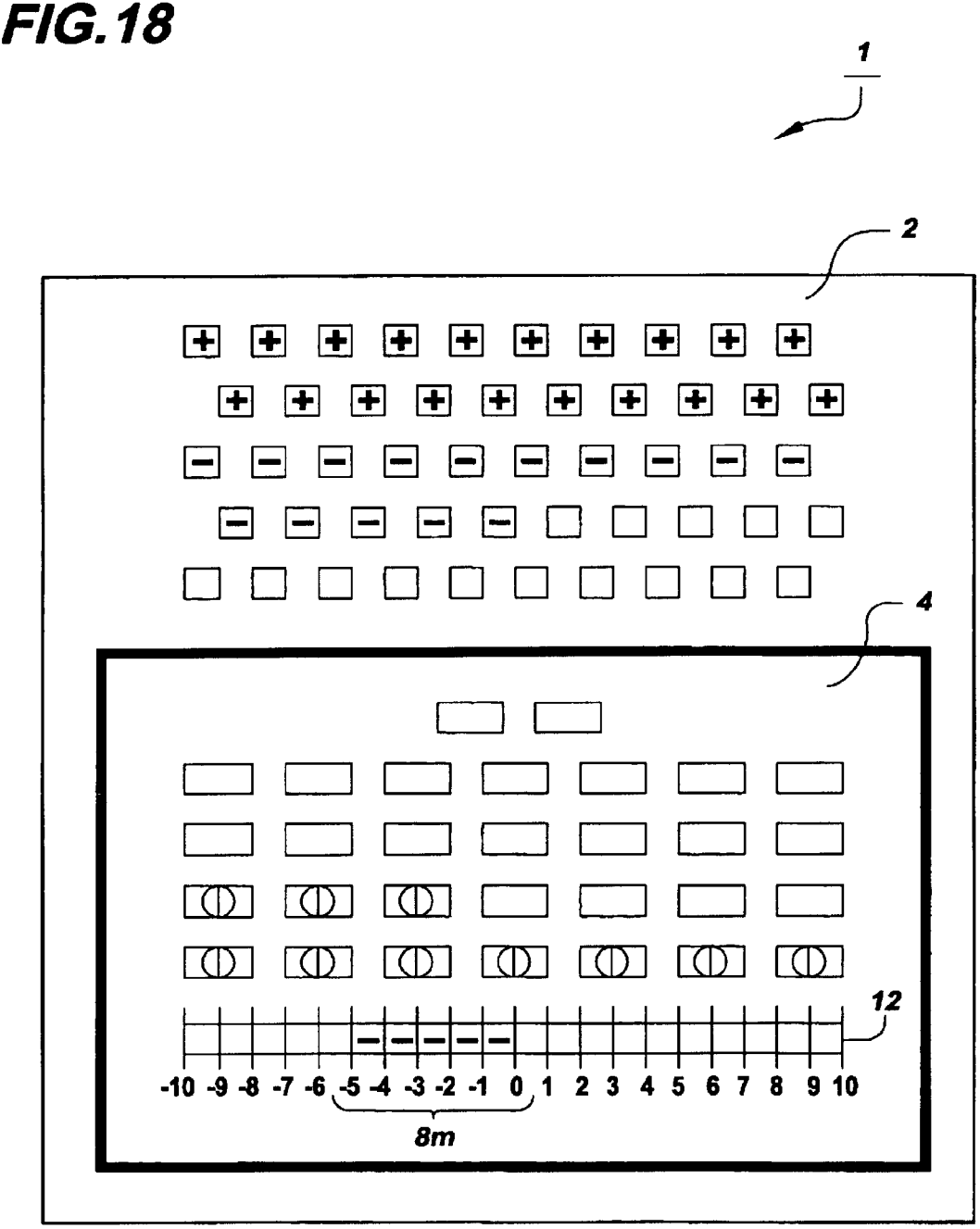
FIG. 18 is a top view of a playing surface employed in the methods of the present invention modified in accordance with the division problem of Example 8.

As shown in FIG. 18, the mathematical expression $(-20)/(+4)$ is solved by moving or adding $(20)/(4)$ or 5 negative units 8m to the demarcated playing zone 4. Accordingly, as shown in FIG. 14, x equals −5.

EXAMPLE 9

Solve the Equation for x: $(-200)/(-25)=x$

Initially, the demarcated playing zone 4 is in the null state as shown in FIG. 1. In the null state, there are no free positive units 6 or free negative units 8 in the demarcated playing zone 4.

It should be noted that the above equation is already written out in full.

Figure 19:
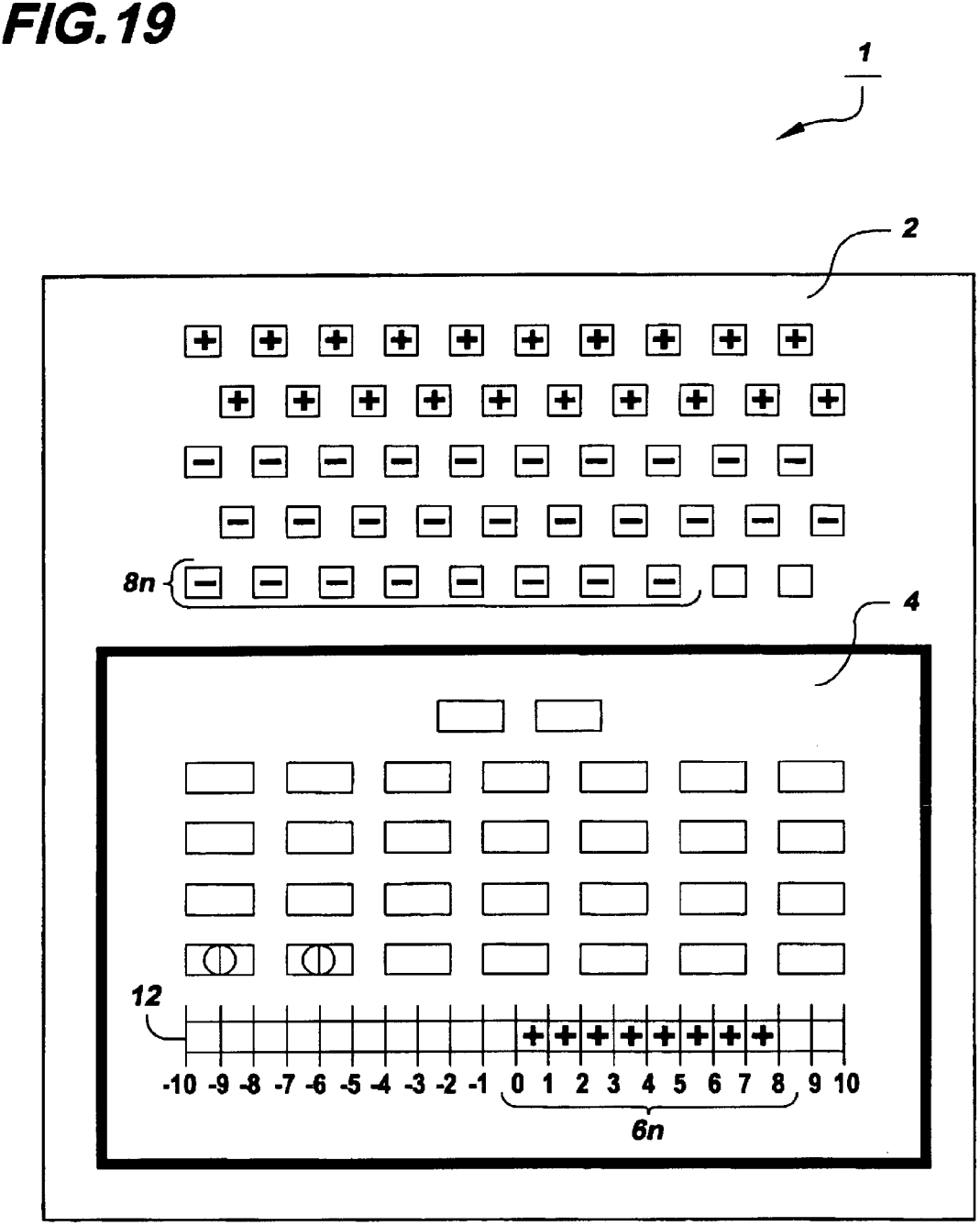
FIG. 19 is a top view of a playing surface employed in the methods of the present invention modified in accordance with the division problem of Example 9.

As shown in FIG. 19, the mathematical expression $(-200)/(-25)$ is solved by removing or subtracting $(200)/(25)$ or 8 negative units 8n from the demarcated playing zone 4. Since there are initially no free negative units 8 in the demarcated playing zone 4, this is accomplished by taking 8 null units 10 that are within the demarcated playing zone 4, breaking or separating them into their constituent positive units 6n and negative units 8n, and removing 8 negative units 8n from the demarcated playing zone 4. Thus, 8 positive units 6n are left behind in the demarcated playing zone 4 and, as shown in FIG. 19, x equals +8.

It should be noted that, if the above-discussed alternative method of treating the signs were employed in solving the division expressions of above Examples 6 through 9, the answers would be the same.

As demonstrated in the following Examples 10 and 11, which again are intended to demonstrate, and not limit, the present invention, the above described methods for adding, subtracting, multiplying, and dividing can be employed to solve a mathematical equation that includes the addition and/or subtraction of one or more multiplication and/or division expressions by themselves and/or together with one or more addition and/or subtraction expressions.

EXAMPLE 10

Solve the Equation for x: $9+((-32)/(4))-((-4)(-2))-3+7=x$

Initially, the demarcated playing zone 4 is in the null state as shown in FIG. 1. In the null state, there are no free positive units 6 or free negative units 8 in the demarcated playing zone 4.

The first step in solving the above equation is to write the equation in full as follows:

$$+9+((-32)/(+4))-((-4)(-2))-(+3)+(+7)=x$$

Next, it is preferred to first solve each of the multiplication and division expressions in the mathematical equation, thereby converting the mathematical equation into one containing only addition and/or subtraction expressions, and solving the resulting mathematical expressions as discussed above.

Solve the Divisional Expression (−32)/(+4)

Initially, the demarcated playing zone 4 is in the null state as shown in FIG. 1. In the null state, there are no free positive units 6 or free negative units 8 in the demarcated playing zone 4.

Figure 20:
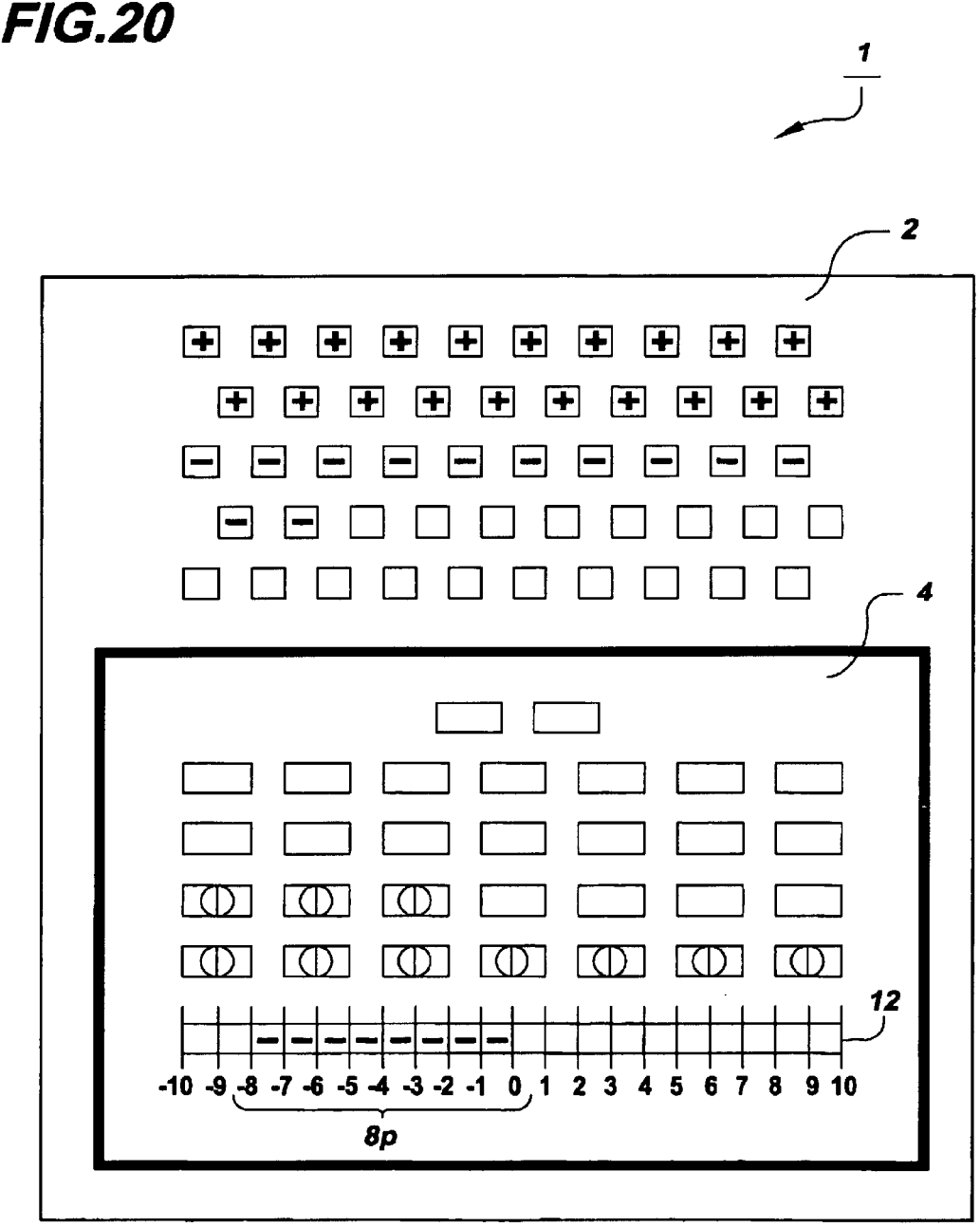
FIG. 20 is a top view of a playing surface employed in the methods of the present invention modified in accordance with the division operation of the mathematical problem of Example 10.

As shown in FIG. 20, the division expression (−32)/(+4) is solved by moving or adding (32)/(4) or 8 negative units $8p$ to the demarcated playing zone 4. Accordingly, as shown in FIG. 20, the divisional expression (−32)/(+4) equals −8.

Solve the Multiplication Expression (−4)(−2)

Initially, the demarcated playing zone 4 is in the null state as shown in FIG. 1. In the null state, there are no free positive units 6 or free negative units 8 in the demarcated playing zone 4.

Figure 21:
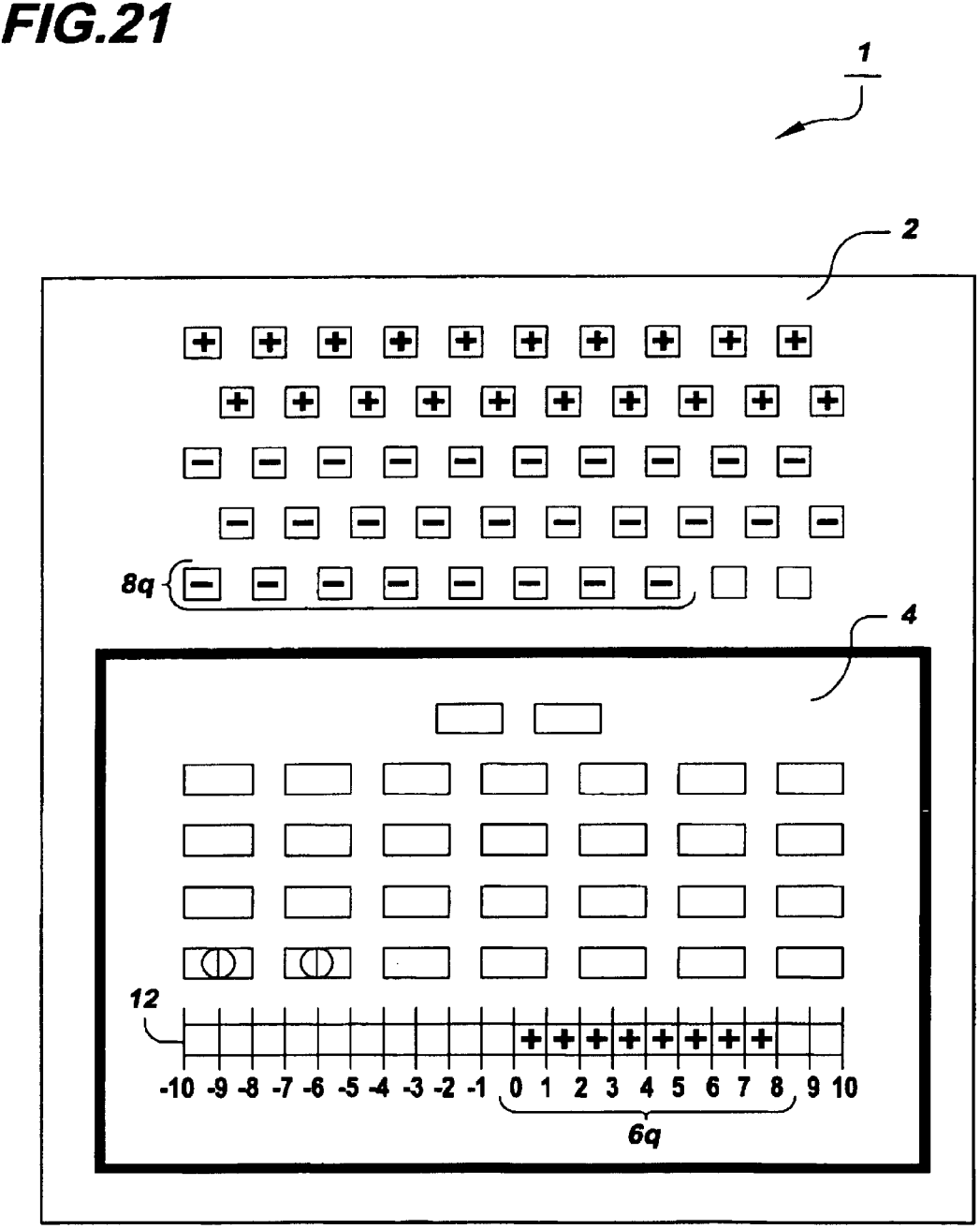
FIG. 21 is a top view of a playing surface employed in the methods of the present invention modified in accordance with the multiplication operation of the mathematical problem of Example 10.

As shown in FIG. 21, the mathematical expression (−4)(−2) is solved by removing or subtracting (4)(2) or 8 negative units $8q$ from the demarcated playing zone 4. Since there are initially no free positive units 6 or free negative units 8 in the demarcated playing zone 4, this is accomplished by taking 8 null units 10 that are in the demarcated playing zone 4, breaking or separating them into their constituent positive units $6q$ and negative units $8q$, and removing 8 negative units $8q$ from the demarcated playing zone 4. Thus, 8 positive units $6q$ are left behind in the demarcated playing zone 4 and, as shown in FIG. 21, the multiplication expression (4)(−2) equals +8.

Substitute Solutions to Division and Multiplication Expressions into Equation

Next, the solutions to the division and multiplication expressions are substituted into the initial equation to yield the following revised equation:

+9+(−8)−(+8)−(+3)+(+7)=x

Accordingly, the revised equation only deals with the addition and subtraction of positive and negative numbers and can be solved in a manner analogous to the methodology employed in above Example 1 as follows:

Solve the Equation

In discussing the solution to foregoing equation, each element of the equation shall be identified as follows:

$X_1 S_2 X_2 S_3 X_3 S_4 X_4 S_5 X_5$

+9+(−8)−(+8)−(+3)+(+7)=x

Figure 22:
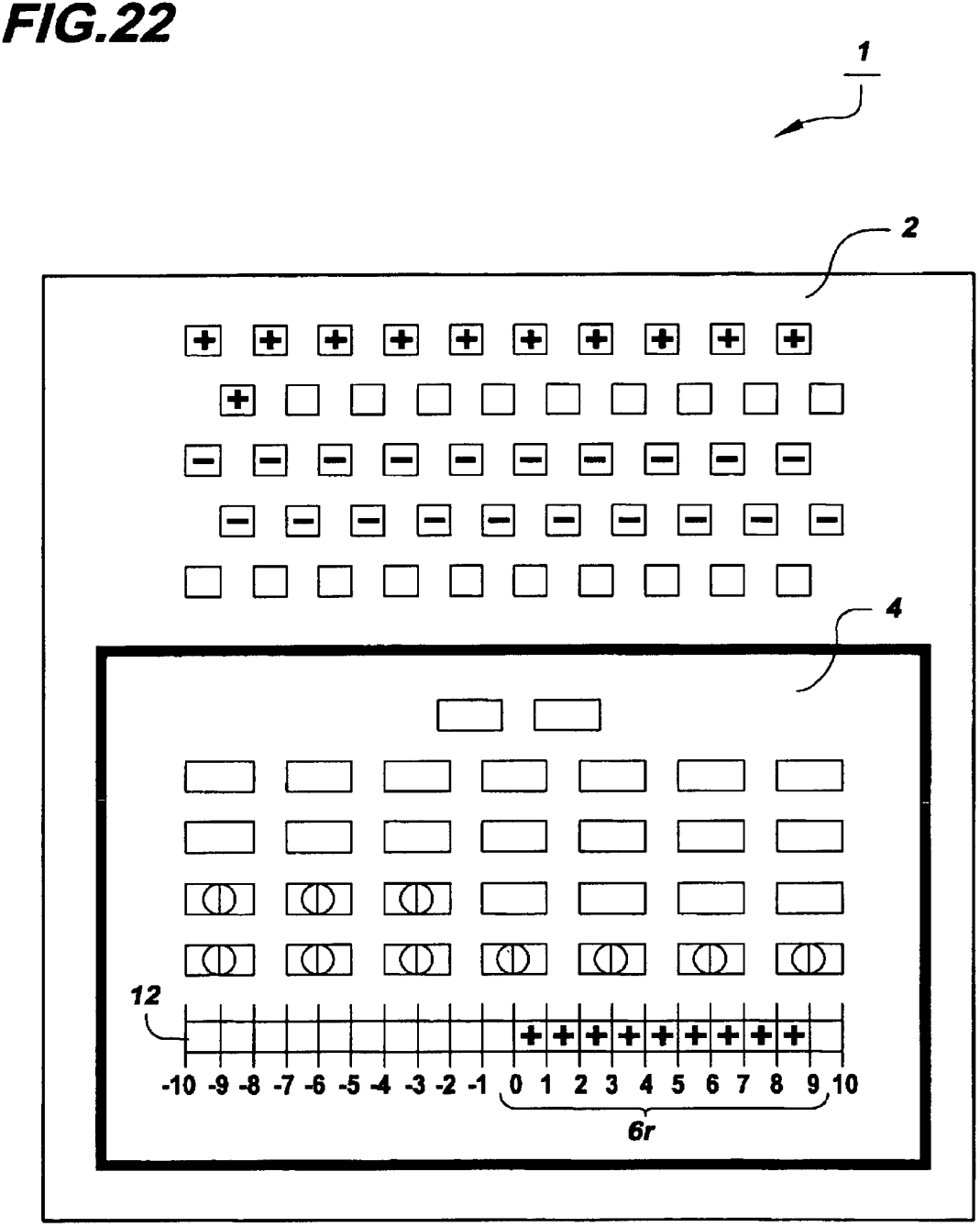
FIG. 22 is a top view of a playing surface employed in the methods of the present invention modified in accordance with the first mathematical operation of the mathematical problem of Example 10.

With respect to the mathematical expression $X_1$, $X_1$ is the initial disturbed state of the demarcated playing zone 4. As shown in FIG. 22, the initial disturbed state of the demarcated playing zone 4 is achieved by moving or adding 9 free positive units $6r$ to the demarcated playing zone 4. The 9 free positive units $6r$ moved into the demarcated playing zone 4 are measured by placing them in the first 9 positive spaces along the axis 12.

Figure 23:
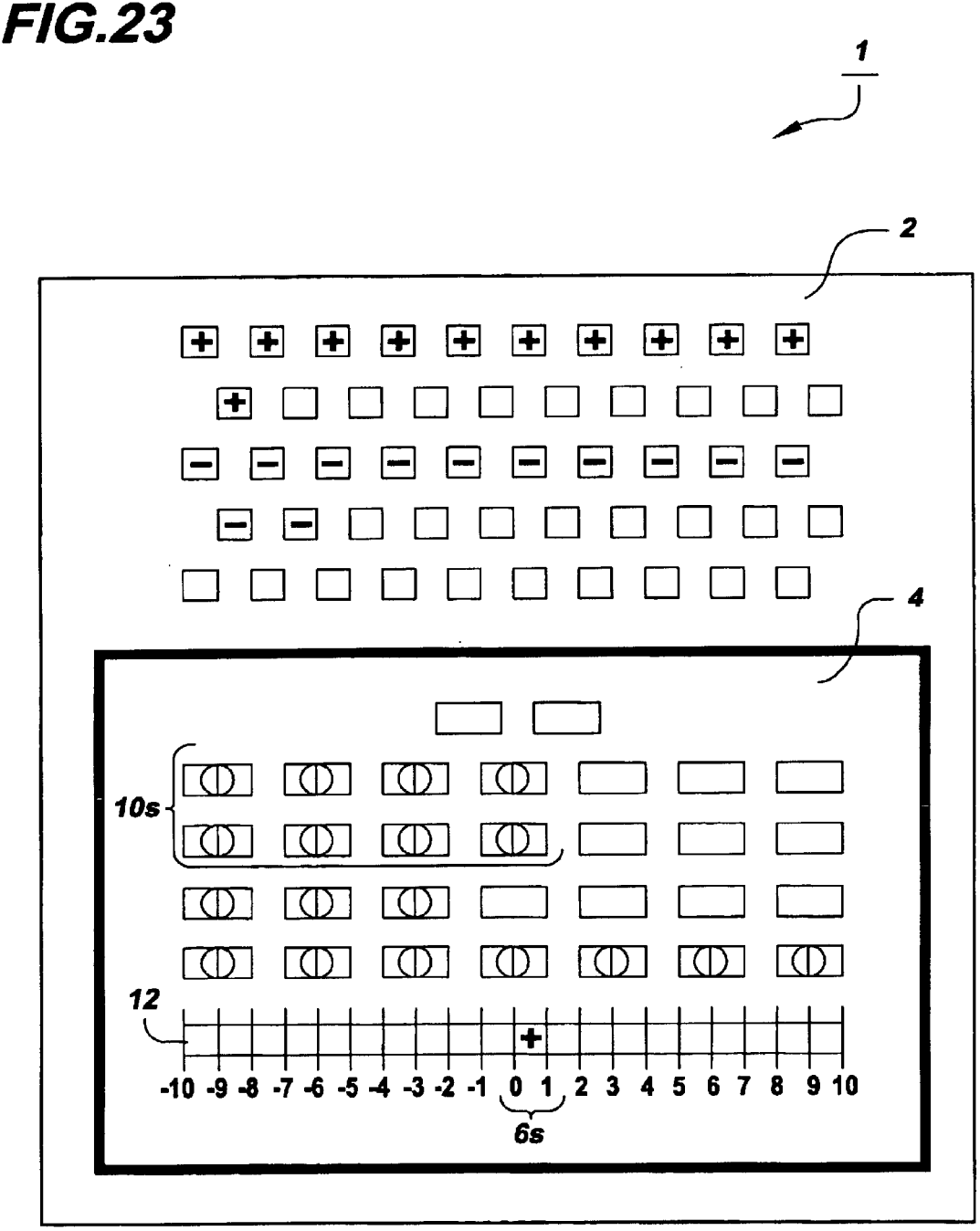
FIG. 23 is a top view of a playing surface employed in the methods of the present invention modified in accordance with the first through second mathematical operations of the mathematical problem of Example 10.

Regarding the mathematical operator $S_2$, $S_2$ is "+", i.e., a positive sign, which denotes that the mathematical expression $X_2$ is to be transported into (i.e., added to) the demarcated playing zone 4. $X_2$ is −8 (i.e., 8 negative units 8). As shown in FIG. 23, all 8 of the 8 negative units 8 that are moved or added to the demarcated playing zone 4 combine with the 8 of the 9 free positive units $6r$ (see FIG. 22) already in the demarcated playing zone 4 to form 8 null units $10s$. Thus, as shown in FIG. 23, there is only 1 positive unit $6s$ left in the demarcated playing zone 4.

Figure 24:
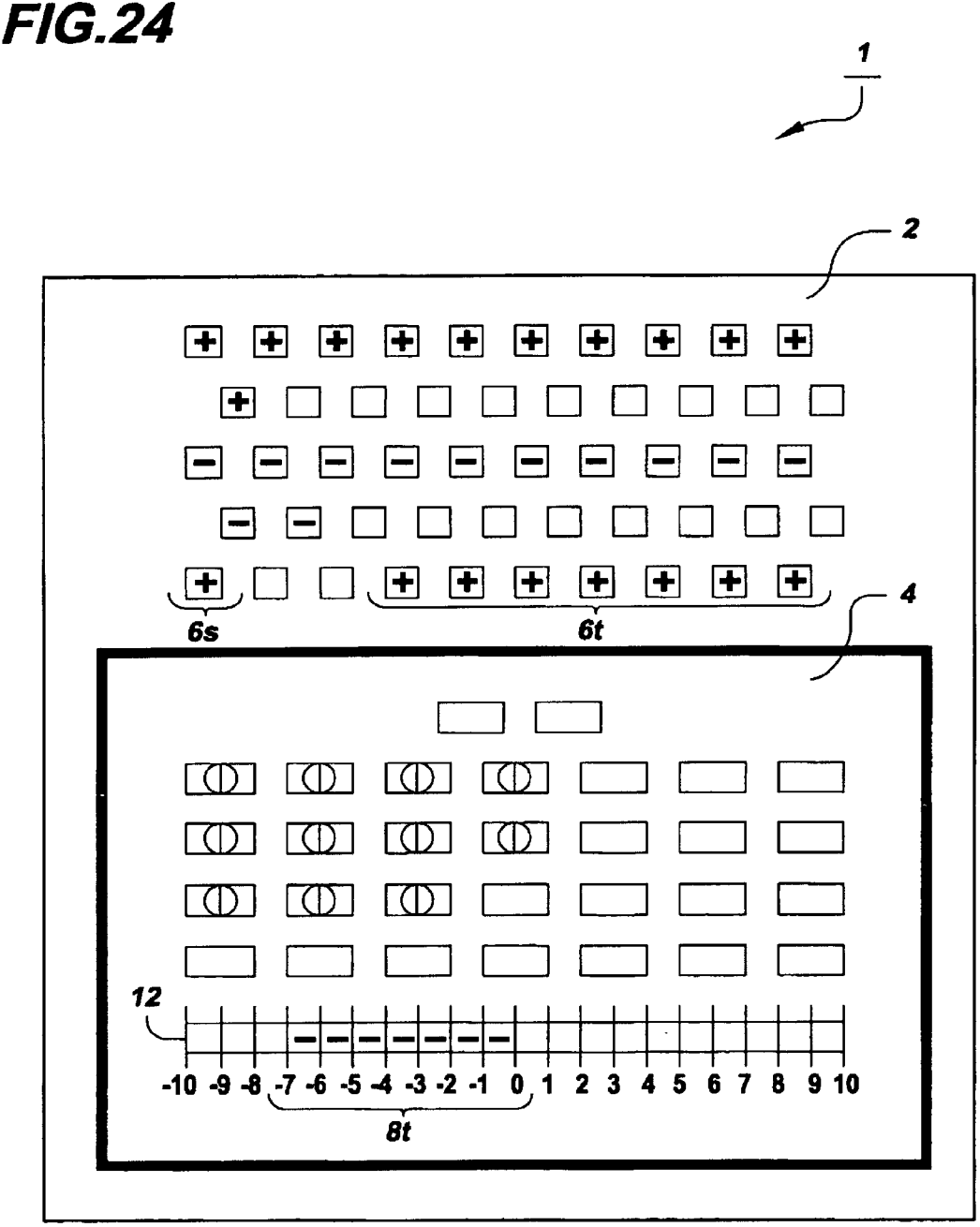
FIG. 24 is a top view of a playing surface employed in the methods of the present invention modified in accordance with the first through third mathematical operations of the mathematical problem of Example 10.

As to the mathematical operator $S_3$, $S_3$ is "−", i.e., a negative sign, which denotes that the mathematical expression $X_3$ is to be transported out of (i.e., subtracted from) the demarcated playing zone 4. $X_3$ is +8 (i.e., 8 positive units 6). As shown in FIG. 23, only 1 of the 8 positive units 6 that are to be removed or subtracted from the demarcated playing zone 4 is present in the demarcated playing zone 4 as free positive unit $6s$. The remaining 7 positive units $6t$ to be transported out of the demarcated playing zone 4 are obtained by taking 7 null units 10 from within the demarcated playing zone 4, breaking or separating these 7 null units 10 into their component parts, namely, 7 free positive units $6t$ and 7 free negative units $8t$, removing the thus obtained 7 free positive units 6t from the demarcated playing zone 4, and placing the remaining 7 free negative units $8t$ in the first 7 negative spaces along the axis 12 as shown in FIG. 24.

Figure 25:
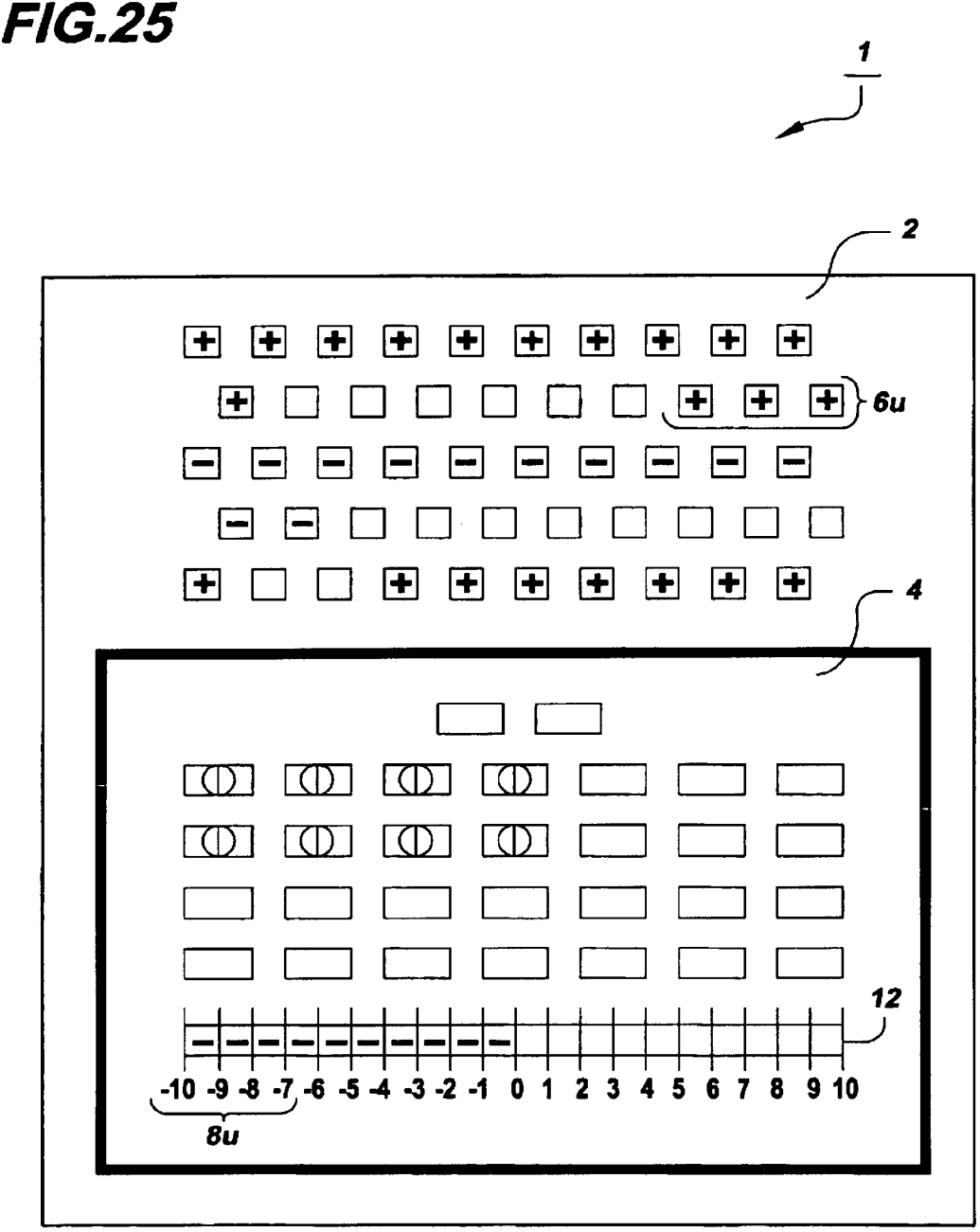
FIG. 25 is a top view of a playing surface employed in the methods of the present invention modified in accordance with the first through fourth mathematical operations of the mathematical problem of Example 10.

With respect to the mathematical operator $S_4$, $S_4$ is "−", i.e., a negative sign, which denotes that the mathematical expression $X_4$ is to be transported out of (i.e., subtracted from) the demarcated playing zone 4. $X_4$ is +3 (i.e., 3 positive units 6). As shown in FIG. 24, none of the 3 positive units 6 to be removed from the demarcated playing zone 4 are present in the demarcated playing zone 4. Accordingly, 3 null units 10 that are within the demarcated playing zone 4 are taken, broken or separated into their 3 constituent positive units $6u$ and their 3 constituent negative units $8u$, and the 3 positive units $6u$ are removed from the demarcated playing zone 4 as shown in FIG. 25. The 3 remaining free negative units $8u$ are added to the negative portion of the axis 12.

Figure 26:
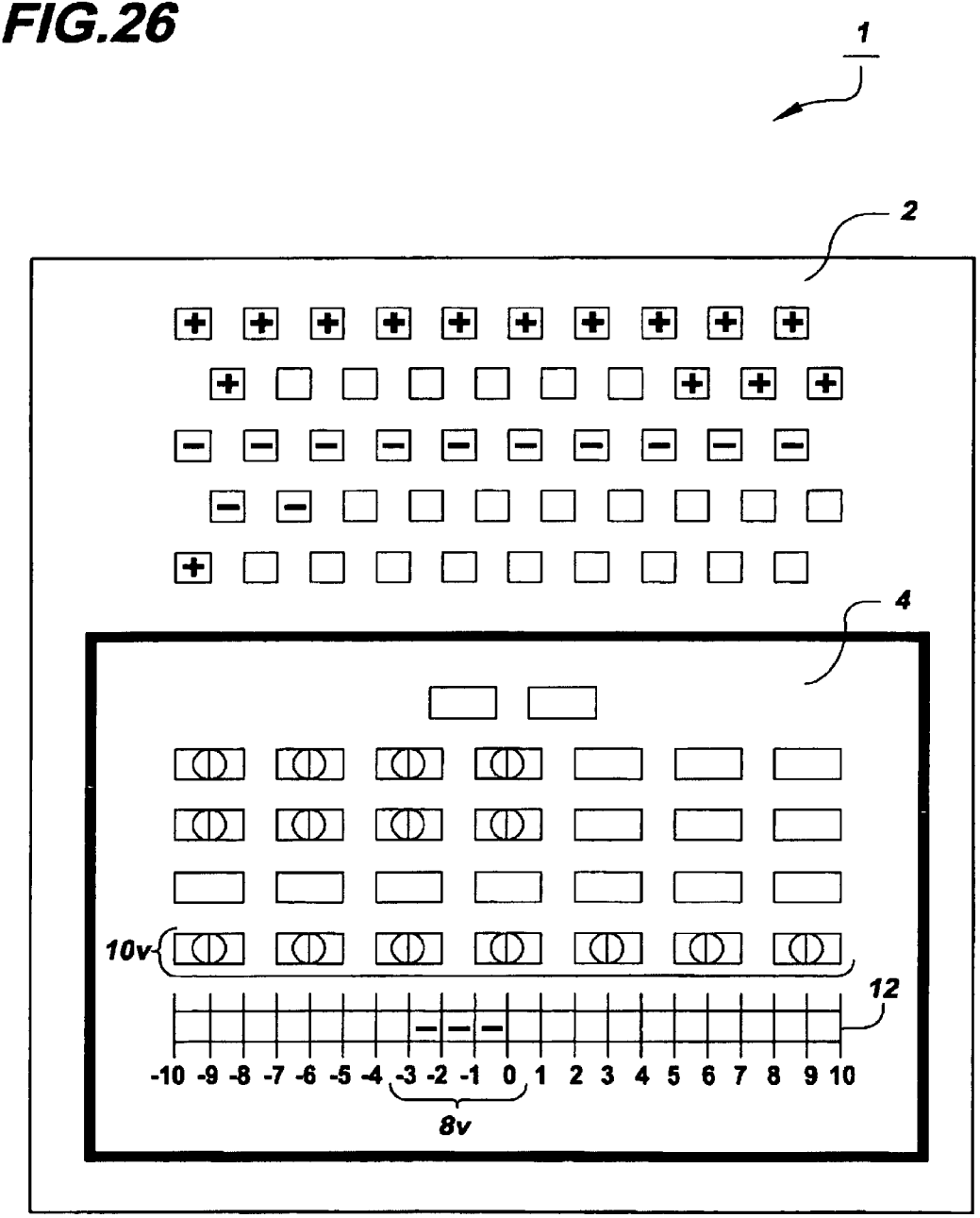
FIG. 26 is a top view of a playing surface employed in the methods of the present invention modified in accordance with the first through fifth mathematical operations of the mathematical problem of Example 10.

Regarding the mathematical operator $S_5$, $S_5$ is "+", i.e., a positive sign, which denotes that the mathematical expression $X_5$ is to be transported into (i.e., added to) the demarcated playing zone 4. $X_5$ is +7 (i.e., 7 positive units 6). As shown in FIG. 25, there are already 10 free negative units 8 in the demarcated playing zone 4. Accordingly, as shown in FIG. 26, the 7 free positive units 6 moved or added to the demarcated playing zone 4 combine with 7 of the free negative units 8 that are already in the demarcated playing zone 4 to form 7 null units $10v$. Thus, only 3 negative units $8v$ are left in the demarcated playing zone 4.

Accordingly, x equals −3.

EXAMPLE 11

Solve the Equation for x: 9+((−32)/(4))−((−4)(−2))−3 +7=x

The equation to be solved in Example 11 is identical to the equation solved in Example 10. However, in the present Example 11, each mathematical expression of the equation is solved sequentially, i.e., without first solving the division and multiplication expressions separately.

Initially, the demarcated playing zone 4 is in the null state as shown in FIG. 1. In the null state, there are no free positive units 6 or free negative units 8 in the demarcated playing zone 4.

The first step in solving the above equation is to write the equation in full as follows:

+9+((−32)/(+4))−((−4)(−2))−(+3)+(+7)=x

Solve the Equation

In discussing the solution to foregoing equation, each element of the equation shall be identified as follows:

$X_1 S_2 X_2 S_3 X_3 S_4 X_4 S_5 X_5$

+9+((−32)/(+4))−((−4)(−2))−(+3)+(+7)=x

With respect to the mathematical expression $X_1$, $X_1$, is the initial disturbed state of the demarcated playing zone 4. As shown in FIG. 22, the initial disturbed state of the demarcated playing zone 4 is achieved by moving or adding 9 free positive units 6r to the demarcated playing zone 4. The 9 free positive units 6r moved into the demarcated playing zone 4 are measured by placing them in the first 9 positive spaces along the axis 12.

Regarding the mathematical operator $S_2$, $S_2$ is "+", i.e., a positive sign, which denotes that the mathematical expression $X_2$ is to be transported into (i.e., added to) the demarcated playing zone 4. $X_2$ is a division expression $(-32)/(+4)$. The division expression $X_2$ must be solved first and then the resulting addition expression A+B can be solved. The division expression $(-32)/(+4)$ is solved by moving or adding $(32)/(4)$ or 8 negative units 8p to the demarcated playing zone 4 which, for purposes of this operation, is initially assumed to be in the null state. Accordingly, as shown in FIG. 20, the divisional expression $(-32)/(+4)$ equals −8 (i.e., 8 negative units 8e). Because $S_1$ is a positive sign, the 8 negative units 8 are moved or added to the demarcated playing zone 4. As shown in FIG. 23, all 8 of the negative units moved into the demarcated playing zone 4 combine with the 8 of the 9 free positive units 6r (see FIG. 22) already in the demarcated playing zone 4 to form 8 null units 10s. Thus, as shown in FIG. 23, there is only 1 positive unit 6s left in the demarcated playing zone 4.

As to the mathematical operator $S_3$, $S_3$ is "−", i.e., a negative sign, which denotes that the mathematical expression $X_3$ is to be transported out of (i.e., subtracted from) the demarcated playing zone 4. $X_3$ is a multiplication expression $(-4)(-2)$. The multiplication expression $X_3$ must be solved first and then the resulting subtraction expression (A+B)−C can be solved. The multiplication expression $(-4)(-2)$ is solved by removing or subtracting $(4)(2)$ or 8 negative units 8q from the demarcated playing zone 4 which, for purposes of this operation, is initially assumed to be in the null state. Since there are initially no free negative units 8 in the demarcated playing zone 4, this is accomplished by taking 8 null units 10 that are in the demarcated playing zone 4, breaking or separating them into their constituent positive units 6q and negative units 8q, and removing 8 negative units 8q from the demarcated playing zone 4. Thus, as shown in FIG. 21, 8 positive units 6q are left behind in the demarcated playing zone 4 and, hence, the multiplication expression $(-4)(-2)$ equals +8. Because $S_2$ is a negative sign, 8 positive units 8 must be removed or subtracted from the demarcated playing zone 4. However, as shown in FIG. 23, only 1 of the 8 positive units 6 that are to be removed or subtracted from the demarcated playing zone 4 are present in the demarcated playing zone 4 as free positive unit 6s. The remaining 7 positive units 6t to be transported out of the demarcated playing zone 4 are obtained by taking 7 null units 10 from within the demarcated playing zone 4, breaking or separating these 7 null units 10 into their component parts, namely, 7 free positive units 6t and 7 free negative units 8t, removing the thus obtained 7 free positive units 6t from the demarcated playing zone 4, and placing the remaining 7 free negative units 8t in the first 7 negative spaces along the axis 12 as shown in FIG. 24.

With respect to the mathematical operator $S_4$, the mathematical expression $X_4$, the mathematical operator $S_5$, and the mathematical expression $X_5$, these mathematical operations are solved in the same manner as demonstrated in above Example 10 to yield x equals −3.

It should be noted that, if the above-discussed alternative method of treating the signs were employed in solving the various mathematical operations of above Examples 10 and 11, the answers would be the same.

As noted with respect to the game apparatus, in the methods of the present invention, each null unit 10 preferably comprises one positive unit 6 reversibly attached to or associated with one negative unit 8.

It is also preferred that the methods of the present invention further comprise the step of measuring the number of the free positive units 6 and the number of the free negative units 8 within the demarcated playing zone 4. In one preferred version of the method of the present invention, the measurement is performed by the step of placing the free positive units 6 that are within the demarcated playing zone 4 along the positive portion of the axis 12 marked with substantially equal spaces from 0 to M and the step of placing the free negative units 8 that are within the demarcated playing zone 4 along the negative portion of the axis 12 marked with substantially equal spaces from 0 to N, where M and N are as defined above. While the positive portion of the axis 12 preferably forms a continuum with the negative portion of the axis 12 (as shown in, for example, FIG. 1), the present invention includes the embodiment where there is a separate positive axis (not shown) having substantially equal spaces from 0 to M and a separate negative axis (not shown) having substantially equal spaces from 0 to N, where M and N are as previously defined.

Figure 27:
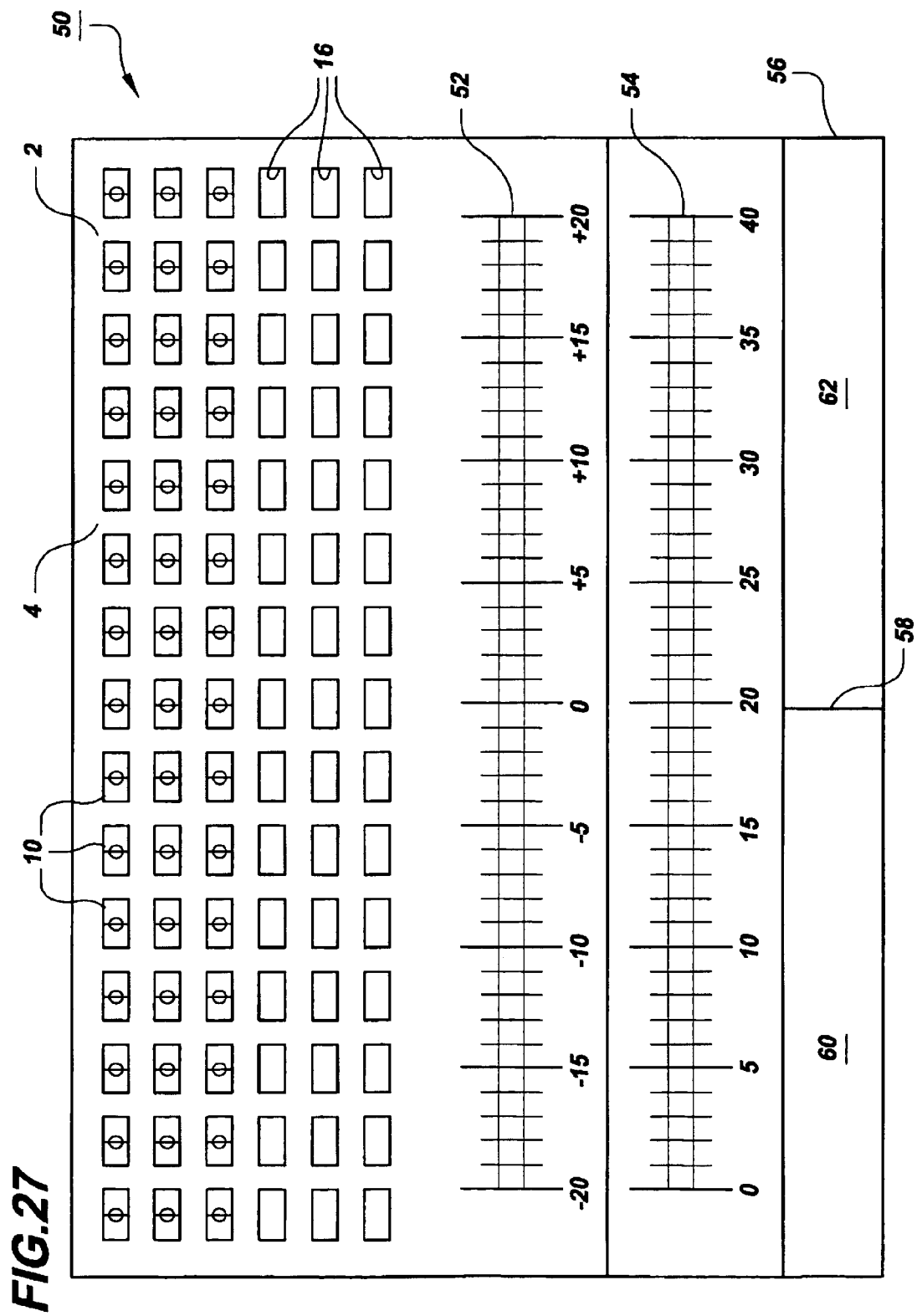
FIG. 27 is a top view of another embodiment of the playing surface employed in the methods of the present invention.

Another preferred game apparatus 50 of the present invention is shown in FIG. 27. Similar to the game apparatus 1 of FIG. 1, the game apparatus 50 of FIG. 27 comprises a playing surface 2, a demarcated playing environment or zone 4 located within the playing surface 2, a plurality of null units 10 (located within the demarcated playing zone 4) removably attached to the playing surface 2, and an axis 52 (located within the demarcated playing zone 4) numbered from −20 to 20.

The playing surface 2 of the game apparatus 50 can also be a game board, a computer screen, a television screen, a liquid crystal display screen, or any other means for displaying the demarcated playing zone 4, the free positive units 6, the free negative units 8, the null units 10, and the axis 52.

In the version of the invention shown in FIG. 27, the null units 10 are also removably attached to the demarcated playing zone 4 by snuggly fitting into depressions 16 in the demarcated playing zone 4. Likewise, other means for removably attaching the null units 10 to the demarcated playing zone 4 also include, but are not limited to, Velcro, snap fittings (such as used on clothing or on Lego® building blocks), screw fittings, magnetism, gravity, etc. In addition, when the playing surface 2 is a computer screen or other essentially two-dimensional means for displaying the playing surface 2, the null units 10 are merely displayed on or merely displayed as being associated with the essentially two-dimensional means for displaying the playing surface 2.

In the embodiment of the invention shown in FIG. 27, the amount of free positive units 6 and free negative units 8 in the demarcated playing zone 4 are measured along the axis 52. As shown in FIG. 27, the axis 52 is numbered from 20 to −20 and is located within the demarcated playing zone 4. However, the axis could just as well be numbered from M to N, where M and N are as defined above. When the playing surface 2 is the display media used in conjunction with a computerized version of the method of the present invention, all that need be shown on the display media is the number of free positive units 6 and/or the number of free negative units 8 within the demarcated playing zone 4.

As shown in FIG. 27, in addition to the axis 52 located within the demarcated playing zone 4, in this embodiment of the invention there is preferably a second axis 54 located outside the demarcated playing zone 4. The second axis 54 is numbered from 0 to 40, but could just as easily be numbered from 0 to P, where P is any whole integer. Commonly, P is a positive integer from 10 to 100, more commonly from 20 to 50, and most commonly from 20 to 40. The purpose of the second axis 54 is to act as a checking point or zone when moving positive units 6 and/or negative units 8 into or out of the demarcated playing zone 4. For example, if a problem called for adding 20 positive units 6 (i.e., +(+20)) to the demarcated playing zone 4, the 20 positive units 6 could be lined up along the second axis 54 before being introduced into the demarcated playing zone 4 to ensure that the correct number of positive units 6 are being transferred into the demarcated playing zone 4. Likewise, if a problem called for removing 35 negative units 8 (i.e., −(−35)) from the demarcated playing zone 4, the negative units 8 removed from the demarcated playing zone 4 could be lined up along the second axis 54 to ensure that 35 negative units 8 have, in fact, been removed from the demarcated playing zone 4.

As also shown in FIG. 27, in this embodiment of the invention, the game apparatus 50 also comprise a groove 56 for holding the free positive units 6 and the free negative units 8 that are outside the demarcated playing zone 4. A divider 58 separates the groove 56 into two portions, with one portion 60 of the groove 56 being used to hold the free positive units 6 that are outside of the demarcated playing zone 4 and the other portion 62 of the groove 56 being used to hold the free negative units 8 that are outside the demarcated playing zone 4.

Figure 10:
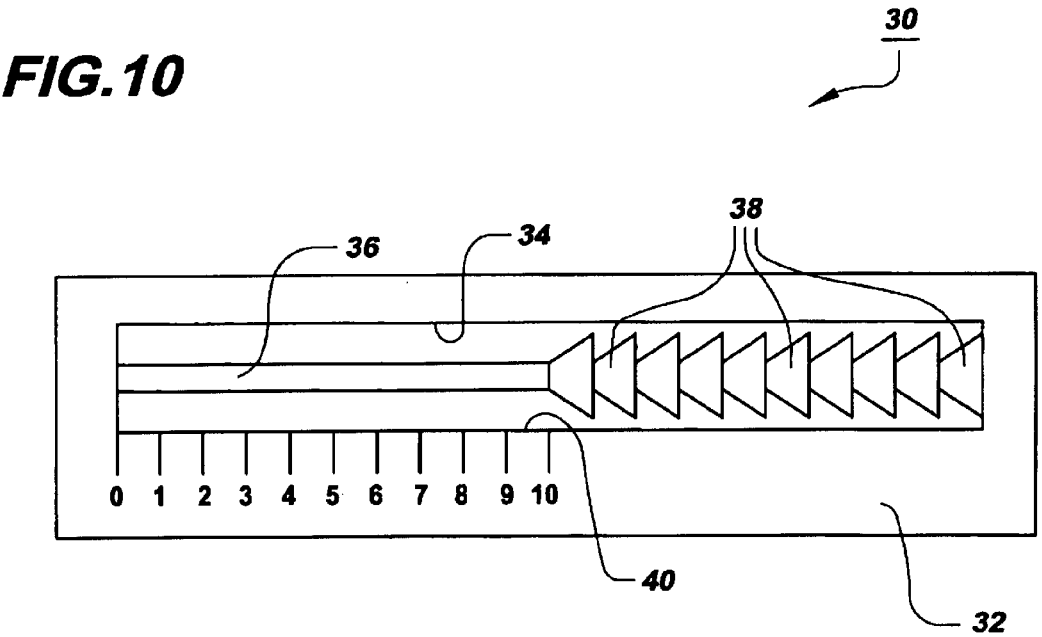
FIG. 10 is a perspective view of the front side of an apparatus within the scope of the present invention for teaching the addition and subtraction of just positive whole numbers.

While the preferred embodiments of the invention have been set forth above in detail, some modifications can be made thereto without departing from the spirit of the present invention. For example, while the above described game apparatuses and methods for adding, subtracting, multiplying, and dividing positive and negative numbers can be employed to teach students to add and subtract just positive numbers, a simpler device, such as the one shown in FIGS. 10 and 11 can be also be used. As shown in FIG. 10, the apparatus 30 comprises a body 32 having an opening 34 therein. In the opening 34 is mounted a dowel 36 and on the dowel are axially moveable beads 38. The number of axially movable beads 38 is generally from 5 to 25 and preferably from 10 to 20. On at least one side of the opening is a scale 40 (such as a ruler or other means for measuring length) for measuring the number of beads 38. The beads 38 can be moved to the left when they are being added and can be moved to the right when they are being subtracted.

Figure 11:
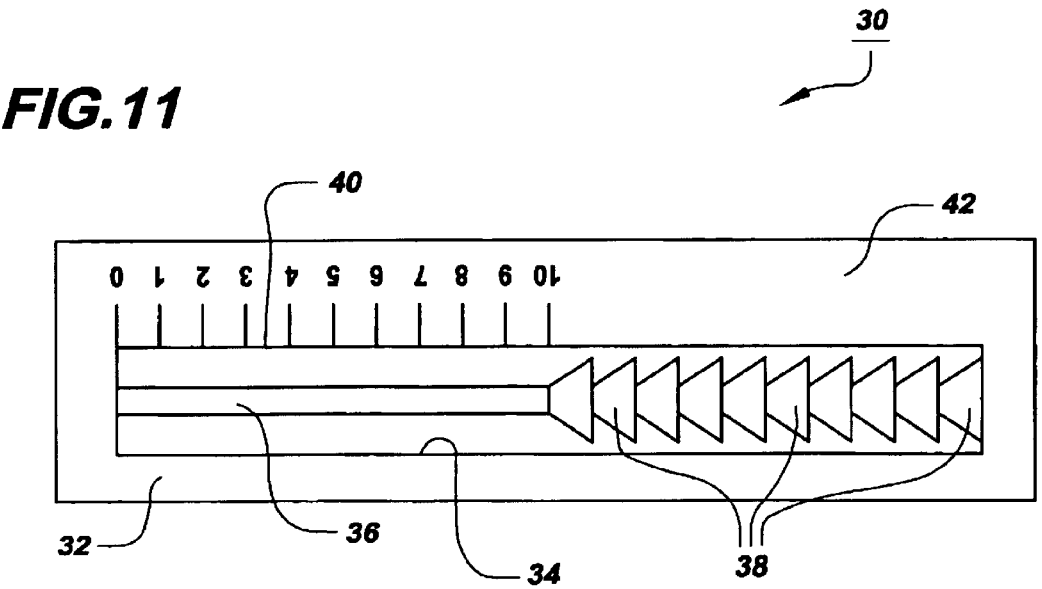
FIG. 11 is a perspective view of the reverse side of the apparatus shown in FIG. 10 for teaching the addition and subtraction of just positive whole numbers.

The reverse side 42 of the apparatus 30 is shown in FIG. 11. In this view of this embodiment of the invention, all the elements mentioned in the preceding paragraph are also present. Accordingly, left- and right-handed students can use the apparatus 30 shown in FIGS. 10 and 11 with equal facility.

Hence, the foregoing alternative embodiments are included within the scope of the present invention.

The apparatuses of the present invention can be made by techniques well know to those skilled in the art (e.g., injection molding, forged, or cast metal, carpentry, etc.). In addition, software programs can be written by those skilled in the art for executing the methods of the present invention and the computerized versions of the invention can be played on a monitor of any suitably programmable electrical apparatus (such as a television screen, computer screen, liquid crystal display, etc.).

What is claimed is:

1. A method for solving a mathematical problem $X_1$ $S_2$ $X_2$, where the mathematical expressions $X_1$, and $X_2$ are independently selected from the group consisting of positive numbers, negative numbers, and combinations thereof, $|X_1|$ is the absolute value of $X_1$, $|X_2|$ is the absolute value of $X_2$, and the mathematical operator $S_2$ is selected from the group consisting of the addition operation and the subtraction operation, the method comprising the steps:

(a) starting play in a null state where a demarcated playing zone comprises a plurality of null units, with each null unit comprising at least one positive unit reversibly associated with at least one negative unit, the number of positive and negative units per null unit being equal;

(b) step (b) is selected from the group consisting of:
   (A) when $X_1$ is a positive number, step (b) is selected from the group consisting of:
      (i) adding $X_1$ free positive units to the demarcated playing zone; and
      (ii) taking $X_1$ null units that are within the demarcated playing zone, separating them into their constituent positive units and negative units, and subtracting $X_1$ negative units from the demarcated playing zone; and
   (B) when $X_1$ is a negative number, step (b) is selected from the group consisting of:
      (i) adding $|X_1|$ free negative units to the demarcated playing zone; and
      (ii) taking $|X_1|$ null units that are within the demarcated playing zone, separating them into their constituent positive units and negative units, and subtracting $|X_1|$ positive units from the demarcated playing zone; and (c) step (c) is selected from the group consisting of:
   (A) when $X_2$ is a positive number and $S_2$ is an addition operation, step (c) comprises adding $X_2$ free positive units to the demarcated playing zone and, if there are any free negative units within the demarcated playing zone, then step (c) further comprises the step of combining up to $X_2$ free negative units that are within the demarcated Playing zone with up to the $X_2$ free positive units that were moved into the demarcated playing zone;
   (B) when $X_2$ is a negative number and $S_2$ is an addition operation, step (c) is selected from the group consisting of:
      (i) adding $|X_2|$ free negative units to the demarcated playing zone and, if there are any free positive units within the demarcated playing zone, then step (c) further comprises the step of combining up to $|X_2|$ free positive units that are within the demarcated playing zone with up to the $|X_2|$ free negative units that were moved into the demarcated playing zone; and
      (ii) subtracting $|X_2|$ free positive units from the demarcated playing zone and, if there are not $|X_2|$ free positive units within the demarcated playing zone to remove from the demarcated playing zone, then step (c) further comprises the step of separating enough null units that are in the demarcated playing zone to obtain up to the required $|X_2|$ free positive units and removing the $|X_2|$ free positive units from the demarcated playing zone;
   (C) when $X_2$ is a positive number and $S_2$ is a subtraction operation, step (c) is selected from the group consisting of:
      (i) subtracting $X_2$ free positive units from the demarcated playing zone and, if there are not $X_2$ free positive units within the demarcated playing zone to remove from the demarcated playing zone, then step (c) further comprises the step of separating enough null units that are in the demarcated playing zone to obtain up to the required $X_2$ free positive units and removing the $X_2$ free positive units from the demarcated playing zone; and (ii) adding $X_2$ free negative units to the demarcated playing zone and, if there are any free positive units within the demarcated playing zone, then step (c) further comprises the step of combining up to $X_2$ free positive units that are within the demarcated playing zone with up to the $X_2$ free negative units that were moved into the demarcated playing zone; and (D) when $X_2$ is a negative number and $S_2$ is a subtraction operation, step (c) comprises subtracting $|X_2|$ free negative units from the demarcated playing zone and, if there are not $|X_2|$ free negative units within the demarcated playing zone to remove from the demarcated playing zone, then step (c) further comprises the step of separating enough null units that are in the demarcated playing zone to obtain up to the required $|X_2|$ free negative units and removing the $|X_2|$ free negative units from the demarcated playing zone.

2. The method of claim 1 where at least one of steps (b) and (c) further comprises at least one of the following steps:

(d) measuring the number of the free positive units within the demarcated playing zone; and (e) measuring the number of the free negative units within the demarcated playing zone.

3. The method of claim 1 where at least one of steps (b) and (c) further comprises at least one of the following steps:

(d) placing the free positive units that are within the demarcated playing zone along the positive portion of an axis marked with substantially equal spaces from 0 to M; and (e) placing the free negative units that are within the demarcated playing zone along the negative portion of the axis marked with substantially equal spaces from 0 to N, with M being a positive whole integer and N being a negative whole integer.

4. The method of claim 1 where each null unit comprises one positive unit reversibly associated with one negative unit.

5. The method of claim 1 where at least one of steps (b) and (c) further comprises at least one of the following steps:

(d) measuring the number of the free positive units to be added to the demarcated playing zone;

(e) measuring the number of the free negative units to be added to the demarcated playing zone;

(f) measuring the number of the free positive units that have been removed from the demarcated playing zone; and (g) measuring the number of the free negative units that have been removed from the demarcated playing zone.

6. The method of claim 1 comprising sequentially performing the following steps:

(a) starting play in a null state where a demarcated playing zone comprises a plurality of null units, with each null unit comprising one positive unit reversibly associated with one negative unit;

(b) step (b) is selected from the group consisting of:

(A) when $X_1$ is a positive number, step (b) comprises adding $X_1$ free positive units to the demarcated playing zone; and (B) when $X_1$ is a negative number, step (b) comprises adding $|X_1|$ free negative units to the demarcated playing zone; and (c) step (c) is selected from the group consisting of:

(A) when $X_2$ is a positive number and $S_2$ is an addition operation, step (c) comprises adding $X_2$ free positive units to the demarcated playing zone and, if there are any free negative units within the demarcated playing zone, then step (c) further comprises the step of combining up to $X_2$ free negative units that are within the demarcated playing zone with up to the $X_2$ free positive units that were moved into the demarcated playing zone;

(B) when $X_2$ is a negative number and $S_2$ is an addition operation, step (c) comprises adding $|X_2|$ free negative units to the demarcated playing zone and, if there are any free positive units within the demarcated playing zone, then step (c) further comprises the step of combining up to $|X_2|$ free positive units that are within the demarcated playing zone with up to the $|X_2|$ free negative units that were moved into the demarcated playing zone;

(C) when $X_2$ is a positive number and $S_2$ is a subtraction operation, step (c) comprises subtracting $X_2$ free positive units from the demarcated playing zone and, if there are not $X_2$ free positive units within the demarcated playing zone to remove from the demarcated playing zone, then step (c) further comprises the step of separating enough null units that are in the demarcated playing zone to obtain up to the required $X_2$ free positive units and removing the $X_2$ free positive units from the demarcated playing zone; and (D) when $X_2$ is a negative number and $S_2$ is a subtraction operation, step (c) comprises subtracting $||X_2|$ free negative units from the demarcated playing zone and, if there are not $|X_2|$ free negative units within the demarcated playing zone to remove from the demarcated playing zone, then step (c) further comprises the step of separating enough null units that are in the demarcated playing zone to obtain up to the required $|X_2|$ free negative units and removing the $|X_2|$ free negative units from the demarcated playing zone.

7. The method of claim 1 where step (b) is selected from the group consisting of:

(A) when $X_1$ is a positive number, step (b) comprises taking $X_1$ null units that are within the demarcated playing zone, separating them into their constituent positive units and negative units, and subtracting $X_1$ negative units from the demarcated playing zone; and (B) when $X_1$ is a negative number, step (b) comprises taking $|X_1|$ null units that are within the demarcated playing zone, separating them into their constituent positive units and negative units, and subtracting $|X_1|$ positive units from the demarcated playing zone.

8. A method for solving a mathematical problem $X_1\ S_2\ X_2\ S_3\ X_3$, where the mathematical expressions $X_1$, $X_2$, and $X_3$ are independently selected from the group consisting of positive numbers, negative numbers, and combinations thereof, $|X_1|$ is the absolute value of $X_1$, $|X_2|$ is the absolute value of $X_2$, $|X_3|$ is the absolute value of $X_3$, and the mathematical operators $S_2$ and $S_3$ are independently selected from the group consisting of the addition operation and the subtraction operation, the method comprising the steps:

(a) starting play in a null state where a demarcated playing zone comprises a plurality of null units, with each null unit comprising at least one positive unit reversibly associated with at least one negative unit, the number of positive and negative units per null unit being equal;

(b) step (b) is selected from the group consisting of:
  (A) when $X_1$ is a positive number, step (b) is selected from the group consisting of:
    (i) adding $X_1$ free positive units to the demarcated playing zone; and
    (ii) taking $X_1$ null units that are within the demarcated playing zone, separating them into their constituent positive units and negative units, and subtracting $X_1$ negative units from the demarcated playing zone; and
  (B) when $X_1$ is a negative number, step (b) is selected from the group consisting of:
    (i) adding $|X_1|$ free negative units to the demarcated playing zone; and
    (ii) taking $|X_1|$ null units that are within the demarcated playing zone, separating them into their constituent positive units and negative units, and subtracting $|X_1|$ positive units from the demarcated playing zone;
(c) step (c) is selected from the group consisting of:
  (A) when $X_2$ is a positive number and $S_2$ is an addition operation, step (c) comprises adding $X_2$ free positive units to the demarcated playing zone and, if there are any free negative units within the demarcated playing zone, then step (c) further comprises the step of combining up to $X_2$ free negative units that are within the demarcated playing zone with up to the $X_2$ free positive units that were moved into the demarcated playing zone;
  (B) when $X_2$ is a negative number and $S_2$ is an addition operation, step (c) is selected from the group consisting of:
    (i) adding $|X_2|$ free negative units to the demarcated playing zone and, if there are any free positive units within the demarcated playing zone, then step (c) further comprises the step of combining up to $|X_2|$ free positive units that are within the demarcated playing zone with up to the $|X_2|$ free negative units that were moved into the demarcated playing zone; and
    (ii) subtracting $|X_2|$ free positive units from the demarcated playing zone and, if there are not $|X_2|$ free positive units within the demarcated playing zone to remove from the demarcated playing zone, then step (c) further comprises the step of separating enough null units that are in the demarcated playing zone to obtain up to the required $|X_2|$ free positive units and removing the $|X_2|$ free positive units from the demarcated playing zone;
  (C) when $X_2$ is a positive number and $S_2$ is a subtraction operation, step (c) is selected from the group consisting of:
    (i) subtracting $X_2$ free positive units from the demarcated playing zone and, if there are not $X_2$ free positive units within the demarcated playing zone to remove from the demarcated playing zone, then step (c) further comprises the step of separating enough null units that are in the demarcated playing zone to obtain up to the required $X_2$ free positive units and removing the $X_2$ free positive units from the demarcated playing zone; and
    (ii) adding $X_2$ free negative units to the demarcated playing zone and, if there are any free positive units within the demarcated playing zone, then step (c) further comprises the step of combining up to $X_2$ free positive units that are within the demarcated playing zone with up to the $X_2$ free negative units that were moved into the demarcated playing zone; and
  (D) when $X_2$ is a negative number and $S_2$ is a subtraction operation, step (c) comprises subtracting $|X_2|$ free negative units from the demarcated playing zone and, if there are not $|X_2|$ free negative units within the demarcated playing zone to remove from the demarcated playing zone, then step (c) further comprises the step of separating enough null units that are in the demarcated playing zone to obtain up to the required $|X_2|$ free negative units and removing the $|X_2|$ free negative units from the demarcated playing zone; and
(d) step (d) is selected from the group consisting of:
  (A) when $X_3$ is a positive number and $S_3$ is an addition operation, step (d) comprises adding $X_3$ free positive units to the demarcated playing zone and, if there are any free negative units within the demarcated playing zone, then step (d) further comprises the step of combining up to $X_3$ free negative units that are within the demarcated playing zone with up to the $X_3$ free positive units that were moved into the demarcated playing zone;
  (B) when $X_3$ is a negative number and $S_3$ is an addition operation, step (d) is selected from the group consisting of:
    (i) adding $|X_3|$ free negative units to the demarcated playing zone and, if there are any free positive units within the demarcated playing zone, then step (d) further comprises the step of combining up to $|X_3|$ free positive units that are within the demarcated playing zone with up to the $|X_3|$ free negative units that were moved into the demarcated playing zone; and
    (ii) subtracting $|X_3|$ free positive units from the demarcated playing zone and, if there are not $|X_3|$ free positive units within the demarcated playing zone to remove from the demarcated playing zone, then step (d) further comprises the step of separating enough null units that are in the demarcated playing zone to obtain up to the required $|X_3|$ free positive units and removing the $|X_3|$ free positive units from the demarcated playing zone;
  (C) when $X_3$ is a positive number and $S_3$ is a subtraction operation, step (d) is selected from the group consisting of:
    (i) subtracting $X_3$ free positive units from the demarcated playing zone and, if there are not $X_3$ free positive units within the demarcated playing zone to remove from the demarcated playing zone, then step (d) further comprises the step of separating enough null units that are in the demarcated playing zone to obtain up to the required $X_3$ free positive units and removing the $X_3$ free positive units from the demarcated playing zone; and
    (ii) adding $X_3$ free negative units to the demarcated playing zone and, if there are any free positive units within the demarcated playing zone, then step (d) further comprises the step of combining up to $X_3$ free positive units that are within the demarcated playing zone with up to the $X_3$ free negative units that were moved into the demarcated playing zone; and
  (D) when $X_3$ is a negative number and $S_3$ is a subtraction operation, step (d) comprises subtracting $|X_3|$ free negative units from the demarcated playing zone and, if there are not $|X_3|$ free negative units within the demarcated playing zone to remove from the demarcated playing zone, then step (d) further comprises the step of separating enough null units that are in the demarcated playing zone to obtain up to the required $|X_3|$ free negative units and removing the $|X_3|$ free negative units from the demarcated playing zone.

9. The method of claim 8, further comprising sequentially performing steps (b) through (d).

10. The method of claim 8 were at least one of steps (b), (c), and (d) further comprises at least one of the following steps:
   (e) measuring the number of the free positive units within the demarcated playing zone; and
   (f) measuring the number of the free negative units within the demarcated playing zone.

11. The method of claim 8 where at least one of steps (b), (c), and (d) further comprises at least one of the following steps:
   (e) placing the free positive units that are within the demarcated playing zone along the positive portion of an axis marked with substantially equal spaces from 0 to M; and
   (f) placing the free negative units that are within the demarcated playing zone along the negative portion of the axis marked with substantially equal spaces from 0 to N, with M being a positive whole integer and N being a negative whole integer.

12. The method of claim 8 where each null unit comprises one positive unit reversibly associated with one negative unit.

13. The method of claim 8 where at least one of steps (b), (c), and (d) further comprises at least one of the following steps:
   (e) measuring the number of the free positive units to be added to the demarcated playing zone;
   (f) measuring the number of the free negative units to be added to the demarcated playing zone;
   (g) measuring the number of the free positive units that have been removed from the demarcated playing zone; and
   (h) measuring the number of the free negative units that have been removed from the demarcated playing zone.

14. The method of claim 8 comprising sequentially performing the following steps:
   (a) starting play in a null state where a demarcated playing zone comprises a plurality of null units, with each null unit comprising one positive unit reversibly associated with one negative unit;
   (b) step (b) is selected from the group consisting of:
      (A) when $X_1$ is a positive number, step (b) comprises adding $X_1$ free positive units to the demarcated playing zone; and
      (B) when $X_1$ is a negative number, step (b) comprises adding $|X_1|$ free negative units to the demarcated playing zone;
   (c) step (c) is selected from the group consisting of:
      (A) when $X_2$ is a positive number and $S_2$ is an addition operation, step (c) comprises adding $X_2$ free positive units to the demarcated playing zone and, if there are any free negative units within the demarcated playing zone, then step (c) further comprises the step of combining up to $X_2$ free negative units that are within the demarcated playing zone with up to the $X_2$ free positive units that were moved into the demarcated playing zone;
      (B) when $X_2$ is a negative number and $S_2$ is an addition operation, step (c) comprises adding $|X_2|$ free negative units to the demarcated playing zone and, if there are any free positive units within the demarcated playing zone, then step (c) further comprises the step of combining up to $|X_2|$ free positive units that are within the demarcated playing zone with up to the $|X_2|$ free negative units that were moved into the demarcated playing zone;
      (C) when $X_2$ is a positive number and $S_2$ is a subtraction operation, step (c) comprises subtracting $X_2$ free positive units from the demarcated playing zone and, if there are not $X_2$ free positive units within the demarcated playing zone to remove from the demarcated playing zone, then step (c) further comprises the step of separating enough null units that are in the demarcated playing zone to obtain up to the required $X_2$ free positive units and removing the $X_2$ free positive units from the demarcated playing zone; and
      (D) when $X_2$ is a negative number and $S_2$ is a subtraction operation, step (c) comprises subtracting $|X_2|$ free negative units from the demarcated playing zone and, if there are not $|X_2|$ free negative units within the demarcated playing zone to remove from the demarcated playing zone, then step (c) further comprises the step of separating enough null units that are in the demarcated playing zone to obtain up to the required $|X_2|$ free negative units and removing the $|X_2|$ free negative units from the demarcated playing zone; and
   (d) step (d) is selected from the group consisting of:
      (A) when $X_3$ is a positive number and $S_3$ is an addition operation, step (d) comprises adding $X_3$ free positive units to the demarcated playing zone and, if there are any free negative units within the demarcated playing zone, then step (d) further comprises the step of combining up to $X_3$ free negative units that are within the demarcated playing zone with up to the $X_3$ free positive units that were moved into the demarcated playing zone;
      (B) when $X_3$ is a negative number and $S_3$ is an addition operation, step (d) comprises adding $|X_3|$ free negative units to the demarcated playing zone and, if there are any free positive units within the demarcated playing zone, then step (d) further comprises the step of combining up to $|X_3|$ free positive units that are within the demarcated playing zone with up to the $|X_3|$ free negative units that were moved into the demarcated playing zone;
      (C) when $X_3$ is a positive number and $S_3$ is a subtraction operation, step (d) comprises subtracting $X_3$ free positive units from the demarcated playing zone and, if there are not $X_3$ free positive units within the demarcated playing zone to remove from the demarcated playing zone, then step (d) further comprises the step of separating enough null units that are in the demarcated playing zone to obtain up to the required $X_3$ free positive units and removing the $X_3$ free positive units from the demarcated playing zone; and
      (D) when $X_3$ is a negative number and $S_3$ is a subtraction operation, step (d) comprises subtracting $|X_3|$ free negative units from the demarcated playing zone and, if there are not $|X_3|$ free negative units within the demarcated playing zone to remove from the demarcated playing zone, then step (d) further comprises the step of separating enough null units that are in the demarcated playing zone to obtain up to the required

|X₃| free negative units and removing the |X₃| free negative units from the demarcated playing zone.

15. The method of claim 8 where step (b) is selected from the group consisting of:
(A) when $X_1$ is a positive number, step (b) comprises taking $X_1$ null units that are within the demarcated playing zone, separating them into their constituent positive units and negative units, and subtracting $X_1$ negative units from the demarcated playing zone; and
(B) when $X_1$ is a negative number, step (b) comprises taking $|X_1|$ null units that are within the demarcated playing zone, separating them into their constituent positive units and negative units, and subtracting $|X_1|$ positive units from the demarcated playing zone.

16. A method for solving a mathematical problem $X_1 S_2 X_2 S_3 X_3 S_4 X_4$, where the mathematical expressions $X_1$, $X_2$, $X_3$, and $X_4$ are independently selected from the group consisting of positive numbers, negative numbers, and combinations thereof, $|X_1|$ is the absolute value of $X_1$, $|X_2|$ is the absolute value of $X_2$, $|X_3|$ is the absolute value of $X_3$, $|X_4|$ is the absolute value of $X_4$, and the mathematical operators $S_2$, $S_3$, and $S_4$ are independently selected from the group consisting of the addition operation and the subtraction operation, the method comprising the steps:

(a) starting play in a null state where a demarcated playing zone comprises a plurality of null units, with each null unit comprising at least one positive unit reversibly associated with at least one negative unit, the number of positive and negative units per null unit being equal;

(b) step (b) is selected from the group consisting of:
(A) when $X_1$ is a positive number, step (b) is selected from the group consisting of:
(i) adding $X_1$ free positive units to the demarcated playing zone; and
(ii) taking $X_1$ null units that are within the demarcated playing zone, separating them into their constituent positive units and negative units, and subtracting $X_1$ negative units from the demarcated playing zone; and
(B) when $X_1$ is a negative number, step (b) is selected from the group consisting of:
(i) adding $|X_1|$ free negative units to the demarcated playing zone; and
(ii) taking $|X_1|$ null units that are within the demarcated playing zone, separating them into their constituent positive units and negative units, and subtracting $|X_1|$ positive units from the demarcated playing zone;

(c) step (c) is selected from the group consisting of:
(A) when $X_2$ is a positive number and $S_2$ is an addition operation, step (c) comprises adding $X_2$ free positive units to the demarcated playing zone and, if there are any free negative units within the demarcated playing zone, then step (c) further comprises the step of combining up to $X_2$ free negative units that are within the demarcated playing zone with up to the $X_2$ free positive units that were moved into the demarcated playing zone;
(B) when $X_2$ is a negative number and $S_2$ is an addition operation, step (c) is selected from the group consisting of:
(i) adding $|X_2|$ free negative units to the demarcated playing zone and, if there are any free positive units within the demarcated playing zone, then step (c) further comprises the step of combining up to $|X_2|$ free positive units that are within the demarcated playing zone with up to the $|X_2|$ free negative units that were moved into the demarcated playing zone; and
(ii) subtracting $|X_2|$ free positive units from the demarcated playing zone and, if there are not $|X_2|$ free positive units within the demarcated playing zone to remove from the demarcated playing zone, then step (c) further comprises the step of separating enough null units that are in the demarcated playing zone to obtain up to the required $|X_2|$ free positive units and removing the $|X_2|$ free positive units from the demarcated playing zone;
(C) when $X_2$ is a positive number and $S_2$ is a subtraction operation, step (c) is selected from the group consisting of:
(i) subtracting $X_2$ free positive units from the demarcated playing zone and, if there are not $X_2$ free positive units within the demarcated playing zone to remove from the demarcated playing zone, then step (c) further comprises the step of separating enough null units that are in the demarcated playing zone to obtain up to the required $X_2$ free positive units and removing the $X_2$ free positive units from the demarcated playing zone; and
(ii) adding $X_2$ free negative units to the demarcated playing zone and, if there are any free positive units within the demarcated playing zone, then step (c) further comprises the step of combining up to $X_2$ free positive units that are within the demarcated playing zone with up to the $X_2$ free negative units that were moved into the demarcated playing zone; and
(D) when $X_2$ is a negative number and $S_2$ is a subtraction operation, step (c) comprises subtracting $|X_2|$ free negative units from the demarcated playing zone and, if there are not $|X_2|$ free negative units within the demarcated playing zone to remove from the demarcated playing zone, then step (c) further comprises the step of separating enough null units that are in the demarcated playing zone to obtain up to the required $|X_2|$ free negative units and removing the $|X_2|$ free negative units from the demarcated playing zone;

(d) step (d) is selected from the group consisting of:
(A) when $X_3$ is a positive number and $S_3$ is an addition operation, step (d) comprises adding $X_3$ free positive units to the demarcated playing zone and, if there are any free negative units within the demarcated playing zone, then step (d) further comprises the step of combining up to $X_3$ free negative units that are within the demarcated playing zone with up to the $X_3$ free positive units that were moved into the demarcated playing zone;
(B) when $X_3$ is a negative number and $S_3$ is an addition operation, step (d) is selected from the group consisting of:
(i) adding $|X_3|$ free negative units to the demarcated playing zone and, if there are any free positive units within the demarcated playing zone, then step (d) further comprises the step of combining up to $|X_3|$ free positive units that are within the demarcated playing zone with up to the $|X_3|$ free negative units that were moved into the demarcated playing zone; and
(ii) subtracting $|X_3|$ free positive units from the demarcated playing zone and, if there are not $|X_3|$ free positive units within the demarcated playing zone to remove from the demarcated playing zone, then step (d) further comprises the step of separating enough null units that are in the demarcated playing zone to obtain up to the required $|X_3|$ free positive units and removing the $|X_3|$ free positive units from the demarcated playing zone;

(C) when $X_3$ is a positive number and $S_3$ is a subtraction operation, step (d) is selected from the group consisting of:

(i) subtracting $X_3$ free positive units from the demarcated playing zone and, if there are not $X_3$ free positive units within the demarcated playing zone to remove from the demarcated playing zone, then step (d) further comprises the step of separating enough null units that are in the demarcated playing zone to obtain up to the required $X_3$ free positive units and removing the $X_3$ free positive units from the demarcated playing zone; and (ii) adding $X_3$ free negative units to the demarcated playing zone and, if there are any free positive units within the demarcated playing zone, then step (d) further comprises the step of combining up to $X_3$ free positive units that are within the demarcated playing zone with up to the $X_3$ free negative units that were moved into the demarcated playing zone; and (D) when $X_3$ is a negative number and $S_3$ is a subtraction operation, step (d) comprises subtracting $|X_3|$ free negative units from the demarcated playing zone and, if there are not $|X_3|$ free negative units within the demarcated playing zone to remove from the demarcated playing zone, then step (d) further comprises the step of separating enough null units that are in the demarcated playing zone to obtain up to the required $|X_3|$ free negative units and removing the $|X_3|$ free negative units from the demarcated playing zone; and (e) step (e) is selected from the group consisting of:

(A) when $X_4$ is a positive number and $S_4$ is an addition operation, step (e) comprises adding $X_4$ free positive units to the demarcated playing zone and, if there are any free negative units within the demarcated playing zone, then step (e) further comprises the step of combining up to $X_4$ free negative units that are within the demarcated playing zone with up to the $X_4$ free positive units that were moved into the demarcated playing zone;

(B) when $X_4$ is a negative number and $S_4$ is an addition operation, step (e) is selected from the group consisting of:

(i) adding $|X_4|$ free negative units to the demarcated playing zone and, if there are any free positive units within the demarcated playing zone, then step (e) further comprises the step of combining up to $|X_4|$ free positive units that are within the demarcated playing zone with up to the $|X_4|$ free negative units that were moved into the demarcated playing zone; and (ii) subtracting $|X_4|$ free positive units from the demarcated playing zone and, if there are not $|X_4|$ free positive units within the demarcated playing zone to remove from the demarcated playing zone, then step (e) further comprises the step of separating enough null units that are in the demarcated playing zone to obtain up to the required $|X_4|$ free positive units and removing the $|X_4|$ free positive units from the demarcated playing zone;

(C) when $X_4$ is a positive number and $S_4$ is a subtraction operation, step (e) is selected from the group consisting of:

(i) subtracting $X_4$ free positive units from the demarcated playing zone and, if there are not $X_4$ free positive units within the demarcated playing zone to remove from the demarcated playing zone, then step (e) further comprises the step of separating enough null units that are in the demarcated playing zone to obtain up to the required $X_4$ free positive units and removing the $X_4$ free positive units from the demarcated playing zone; and (ii) adding $X_4$ free negative units to the demarcated playing zone and, if there are any free positive units within the demarcated playing zone, then step (e) further comprises the step of combining up to $X_4$ free positive units that are within the demarcated playing zone with up to the $X_4$ free negative units that were moved into the demarcated playing zone; and (D) when $X_4$ is a negative number and $S_4$ is a subtraction operation, step (e) comprises subtracting $|X_4|$ free negative units from the demarcated playing zone and, if there are not $|X_4|$ free negative units within the demarcated playing zone to remove from the demarcated playing zone, then step (e) further comprises the step of separating enough null units that are in the demarcated playing zone to obtain up to the required $|X_4|$ free negative units and removing the $|X_4|$ free negative units from the demarcated playing zone.

17. The method of claim 16 further comprising sequentially performing steps (b) through (e).

18. The method of claim 16 where at least one of steps (b), (c), (d), and (e) further comprises at least one of the following steps:

(f) measuring the number of the free positive units within the demarcated playing zone; and (g) measuring the number of the free negative units within the demarcated playing zone.

19. The method of claim 16 comprising sequentially performing the following steps:

(a) starting play in a null state where a demarcated playing zone comprises a plurality of null units, with each null unit comprising one positive unit reversibly associated with one negative unit;

(b) step (b) is selected from the group consisting of:

(A) when $X_1$ is a positive number, step (b) comprises adding $X_1$ free positive units to the demarcated playing zone; and (B) when $X_1$ is a negative number, step (b) comprises adding $|X_1|$ free negative units to the demarcated playing zone;

(c) step (c) is selected from the group consisting of:

(A) when $X_2$ is a positive number and $S_2$ is an addition operation, step (c) comprises adding $X_2$ free positive units to the demarcated playing zone and, if there are any free negative units within the demarcated playing zone, then step (c) further comprises the step of combining up to $X_2$ free negative units that are within the demarcated playing zone with up to the $X_2$ free positive units that were moved into the demarcated playing zone;

(B) when $X_2$ is a negative number and $S_2$ is an addition operation, step (c) comprises adding $|X_2|$ free negative units to the demarcated playing zone and, if there are any free positive units within the demarcated playing zone, then step (c) further comprises the step of combining up to $|X_2|$ free positive units that are within the demarcated playing zone with up to the $|X_2|$ free negative units that were moved into the demarcated playing zone;

(C) when $X_2$ is a positive number and $S_2$ is a subtraction operation, step (c) comprises subtracting $X_2$ free positive units from the demarcated playing zone and, if there are not $X_2$ free positive units within the demarcated playing zone to remove from the demarcated playing zone, then step (c) further comprises the step of separating enough null units that are in the demarcated playing zone to obtain up to the required $X_2$ free positive units and removing the $X_2$ free positive units from the demarcated playing zone; and (D) when $X_2$ is a negative number and $S_2$ is a subtraction operation, step (c) comprises subtracting $|X_2|$ free negative units from the demarcated playing zone and, if there are not $|X_2|$ free negative units within the demarcated playing zone to remove from the demarcated playing zone, then step (c) further comprises the step of separating enough null units that are in the demarcated playing zone to obtain up to the required $|X_2|$ free negative units and removing the $|X_2|$ free negative units from the demarcated playing zone;

(d) step (d) is selected from the group consisting of:

(A) when $X_3$ is a positive number and $S_3$ is an addition operation, step (d) comprises adding $X_3$ free positive units to the demarcated playing zone and, if there are any free negative units within the demarcated playing zone, then step (d) further comprises the step of combining up to $X_3$ free negative units that are within the demarcated playing zone with up to the $X_3$ free positive units that were moved into the demarcated playing zone;

(B) when $X_3$ is a negative number and $S_3$ is an addition operation, step (d) comprises adding $|X_3|$ free negative units to the demarcated playing zone and, if there are any free positive units within the demarcated playing zone, then step (d) further comprises the step of combining up to $|X_3|$ free positive units that are within the demarcated playing zone with up to the $|X_3|$ free negative units that were moved into the demarcated playing zone;

(C) when $X_3$ is a positive number and $S_3$ is a subtraction operation, step (d) comprises subtracting $X_3$ free positive units from the demarcated playing zone and, if there are not $X_3$ free positive units within the demarcated playing zone to remove from the demarcated playing zone, then step (d) further comprises the step of separating enough null units that are in the demarcated playing zone to obtain up to the required $X_3$ free positive units and removing the $X_3$ free positive units from the demarcated playing zone; and (D) when $X_3$ is a negative number and $S_3$ is a subtraction operation, step (d) comprises subtracting $|X_3|$ free negative units from the demarcated playing zone and, if there are not $|X_3|$ free negative units within the demarcated playing zone to remove from the demarcated playing zone, then step (d) further comprises the step of separating enough null units that are in the demarcated playing zone to obtain up to the required $|X_3|$ free negative units and removing the $|X_3|$ free negative units from the demarcated playing zone; and (e) step (e) is selected from the group consisting of:

(A) when $X_4$ is a positive number and $S_4$ is an addition operation, step (e) comprises adding $X_4$ free positive units to the demarcated playing zone and, if there are any free negative units within the demarcated playing zone, then step (e) further comprises the step of combining up to $X_4$ free negative units that are within the demarcated playing zone with up to the $X_4$ free positive units that were moved into the demarcated playing zone;

(B) when $X_4$ is a negative number and $S_4$ is an addition operation, step (e) comprises adding $|X_4|$ free negative units to the demarcated playing zone and, if there are any free positive units within the demarcated playing zone, then step (e) further comprises the step of combining up to $|X_4|$ free positive units that are within the demarcated playing zone with up to the $|X_4|$ free negative units that were moved into the demarcated playing zone;

(C) when $X_4$ is a positive number and $S_4$ is a subtraction operation, step (e) comprises subtracting $X_4$ free positive units from the demarcated playing zone and, if there are not $X_4$ free positive units within the demarcated playing zone to remove from the demarcated playing zone, then step (e) further comprises the step of separating enough null units that are in the demarcated playing zone to obtain up to the required $X_4$ free positive units and removing the $X_4$ free positive units from the demarcated playing zone; and (D) when $X_4$ is a negative number and $S_4$ is a subtraction operation, step (e) comprises subtracting $|X_4|$ free negative units from the demarcated playing zone and, if there are not $|X_4|$ free negative units within the demarcated playing zone to remove from the demarcated playing zone, then step (e) further comprises the step of separating enough null units that are in the demarcated playing zone to obtain up to the required $|X_4|$ free negative units and removing the $|X_4|$ free negative units from the demarcated playing zone.

* * * * *